United States Patent
Todasco

(10) Patent No.: US 10,497,036 B2
(45) Date of Patent: Dec. 3, 2019

(54) CUSTOMER SHOPPING HELP SYSTEM

(71) Applicant: PAYPAL, INC., San Jose, CA (US)

(72) Inventor: Michael Todasco, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 543 days.

(21) Appl. No.: 14/872,697

(22) Filed: Oct. 1, 2015

(65) Prior Publication Data

US 2016/0027080 A1 Jan. 28, 2016

Related U.S. Application Data

(63) Continuation of application No. 14/178,125, filed on Feb. 11, 2014, now abandoned.
(Continued)

(51) Int. Cl.
*G06Q 30/00* (2012.01)
*G06Q 30/06* (2012.01)
(Continued)

(52) U.S. Cl.
CPC ..... *G06Q 30/0613* (2013.01); *G06Q 30/0631* (2013.01); *G06Q 30/0633* (2013.01);
(Continued)

(58) Field of Classification Search
CPC .................................................. G06Q 30/0631
(Continued)

(56) References Cited

U.S. PATENT DOCUMENTS 7,010,501 B1* 3/2006 Roslak .................. G06Q 20/20
705/23
7,974,869 B1* 7/2011 Sharma .............. G06Q 30/0202
705/7.31
(Continued)

OTHER PUBLICATIONS

"Beacons: Get to the Point." Trepoint Whitepaper Series. Created Oct. 18, 2013. Retrieved on Apr. 27, 2017 from http://www.trepoint.com/whitepaper/Beacons-GetToThePoint/Whitepapers/TrepointWP_Beacons-Get_to_The_Point.pdf (Year: 2013).*
(Continued)

*Primary Examiner* — Abby J Flynn
*Assistant Examiner* — Arielle E Weiner
(74) *Attorney, Agent, or Firm* — Haynes and Boone, LLP

(57) ABSTRACT

Systems and methods for providing customer shopping help include a system provider device that receives first customer location information from a plurality of beacon devices at a merchant physical location. The first customer location information is collected during a shopping session from a first customer device that is associated with a first customer. The system provider device analyzes the first customer location information to determine a merchant physical location area that is included in the merchant physical location and in which the first customer has not been located during the shopping session. The system provider device then selects a first product, from a plurality of products that are associated with the merchant physical location in a database, which is located in the merchant physical location area. The system provider device then provides a product recommendation for the first product over the network for display on the first customer device.

20 Claims, 22 Drawing Sheets

Related U.S. Application Data

(60) Provisional application No. 61/910,636, filed on Dec. 2, 2013.

(51) Int. Cl.
    *H04W 4/70* (2018.01)
    *G06Q 30/02* (2012.01)

(52) U.S. Cl.
    CPC ......... *G06Q 30/0639* (2013.01); *H04W 4/70* (2018.02); *G06Q 30/0261* (2013.01)

(58) Field of Classification Search
    USPC .............................................. 705/26.1–27.2
    See application file for complete search history.

(56) References Cited

U.S. PATENT DOCUMENTS

| | | | |
|---|---|---|---|
| 2004/0039661 A1* | 2/2004 | Fuzell-Casey | G06Q 30/02 705/26.81 |
| 2009/0012704 A1* | 1/2009 | Franco | G01C 21/20 701/532 |
| 2011/0106624 A1* | 5/2011 | Bonner | G06Q 30/0261 705/14.58 |
| 2012/0268252 A1* | 10/2012 | Lee | G06Q 10/06316 340/10.1 |
| 2013/0030915 A1 | 1/2013 | Steller et al. | |
| 2013/0103539 A1* | 4/2013 | Abraham | G06Q 30/0633 705/26.8 |
| 2013/0173435 A1 | 7/2013 | Cozad, Jr. | |
| 2013/0225197 A1 | 8/2013 | McGregor et al. | |
| 2014/0214572 A1 | 7/2014 | Cancro et al. | |
| 2014/0214595 A1* | 7/2014 | Argue | G06Q 30/0633 705/26.8 |
| 2014/0283025 A1* | 9/2014 | Rodriguez | G06Q 30/02 726/22 |
| 2015/0154674 A1 | 6/2015 | Todasco | |
| 2015/0154675 A1 | 6/2015 | Todasco | |

OTHER PUBLICATIONS

Malone, Jim. "Right Product, Right Price, Right Place," Retail Solutions Brief, RIS News.com Nov. 2010. pp. 17-23; Retrieved by USPTO Apr. 20, 2015 from <https://www.7thonline.com/images/common/RISArticle-MaloneNov201 O.pdf>.

"Merchandising Planograms," Todays Plan for Profit. Page capture from Internet Archive wayback machine Jan. 6, 2013. Retrieved by USPTO Apr. 19, 2015 from <http://www.todaysplanforprofit.com/merchandising-planogram.php>.

\* cited by examiner

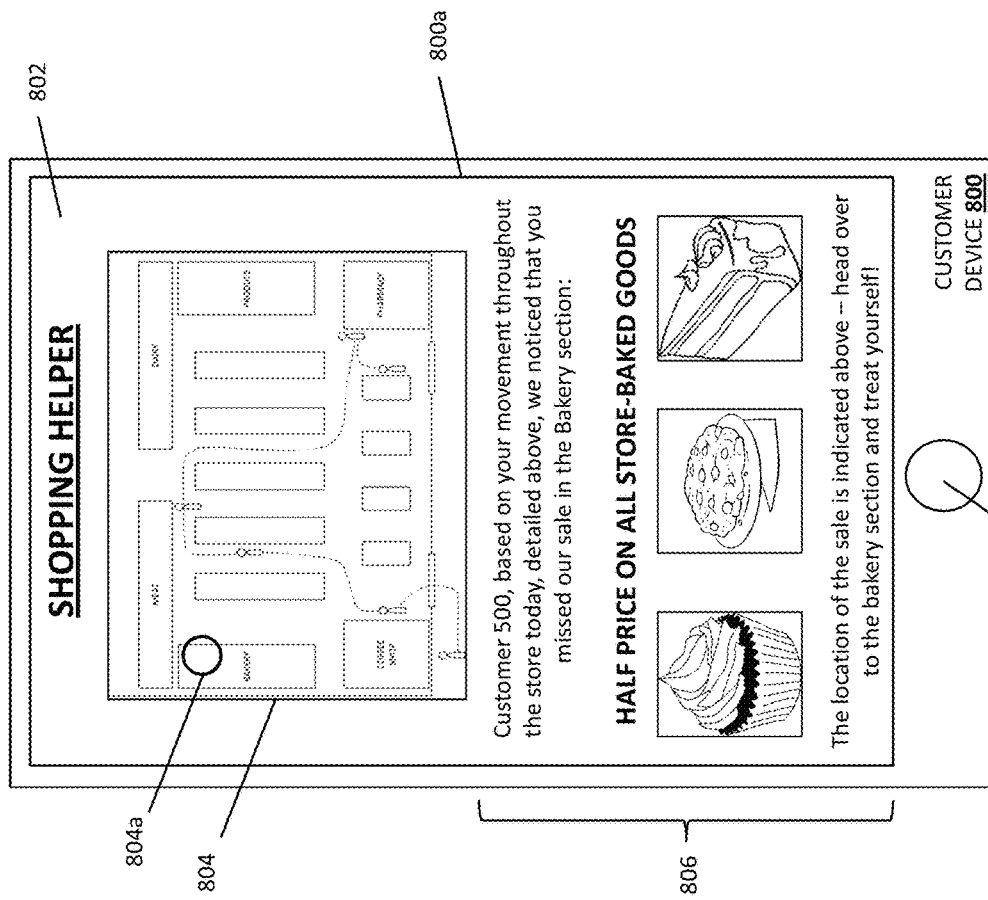

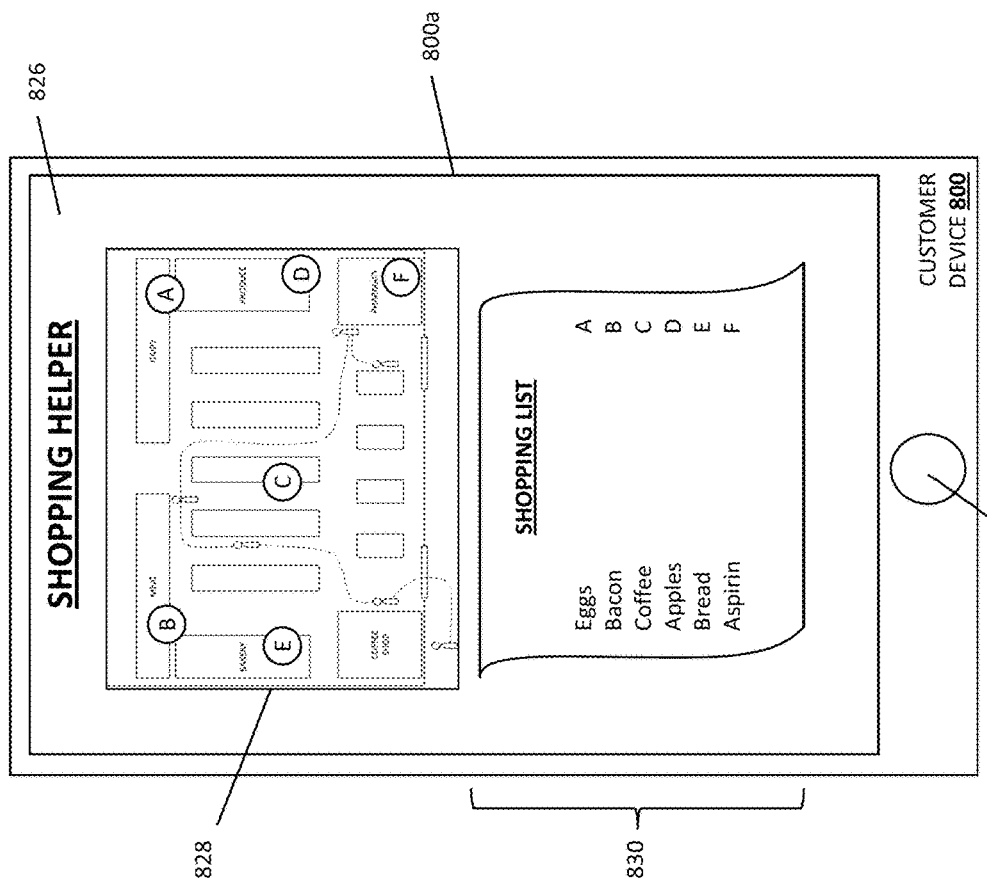

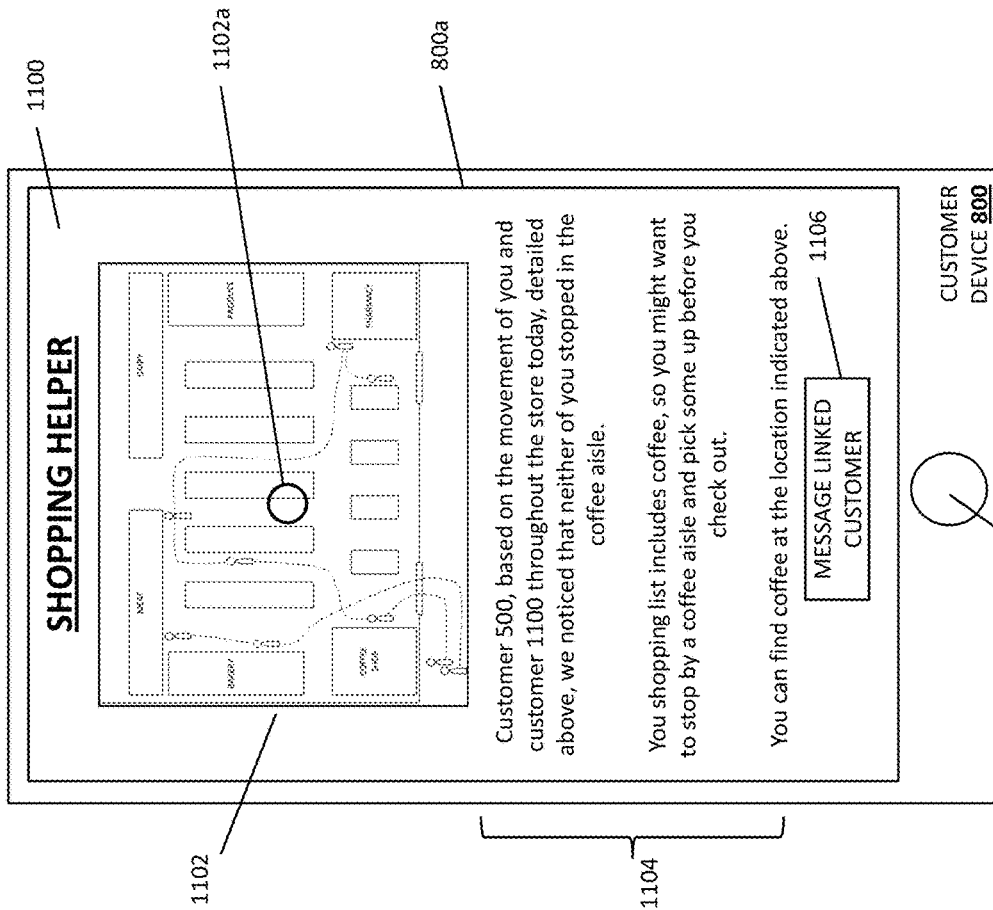

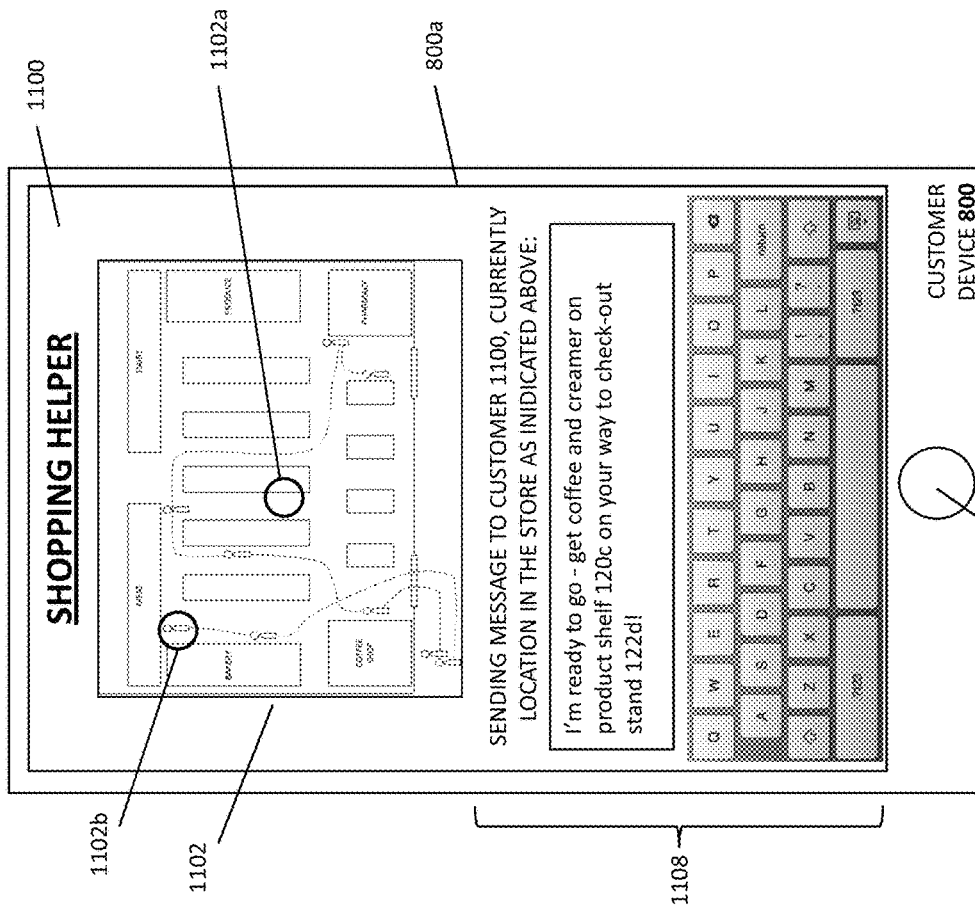

CUSTOMER SHOPPING HELP SYSTEM

CROSS-REFERENCE

This application is a Continuation of U.S. Utility application Ser. No. 14/178,125 filed Feb. 11, 2014, entitled "CUSTOMER SHOPPING HELP SYSTEM", which claims priority to U.S. Provisional patent application Ser. No. 61/910,636, filed on Dec. 2, 2013, entitled "CUSTOMER SHOPPING HELP SYSTEM,". The present application is related to U.S. Utility patent application Ser. No. 14/178,111, filed Feb. 11, 2014, entitled "CUSTOMER SHOPPING HELP SYSTEM", the disclosures of which are incorporated herein by reference.

BACKGROUND

Field of the Invention

The present disclosure generally relates to physical merchant locations, and more particularly to a customer shopping help system for physical merchant locations.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Some payment service providers provide online and mobile payment services for merchants with physical merchant locations and their customers. For example, payment service providers may provide the online and/or mobile payment services discussed above, and in the course of doing so, collect data about customer payment habits with the merchants. However, such data is limited to transactions conducted between customers and merchants, and thus any attempt to analyze that data for assisting the customer in making purchases is limited to data collected from purchases by that customer from that merchant or other merchants.

Thus, there is a need for an improved customer shopping help system.

BRIEF DESCRIPTION OF THE FIGURES

FIG. 8a is a front view illustrating an embodiment of a customer device displaying a product recommendation screen;

FIG. 8e is a front view illustrating an embodiment of a customer device displaying a shopping list product location screen;

FIG. 11a is a front view illustrating an embodiment of a customer device displaying a product recommendation screen;

FIG. 11b is a front view illustrating an embodiment of a customer device displaying a linked customer messaging screen;

Figure 1:
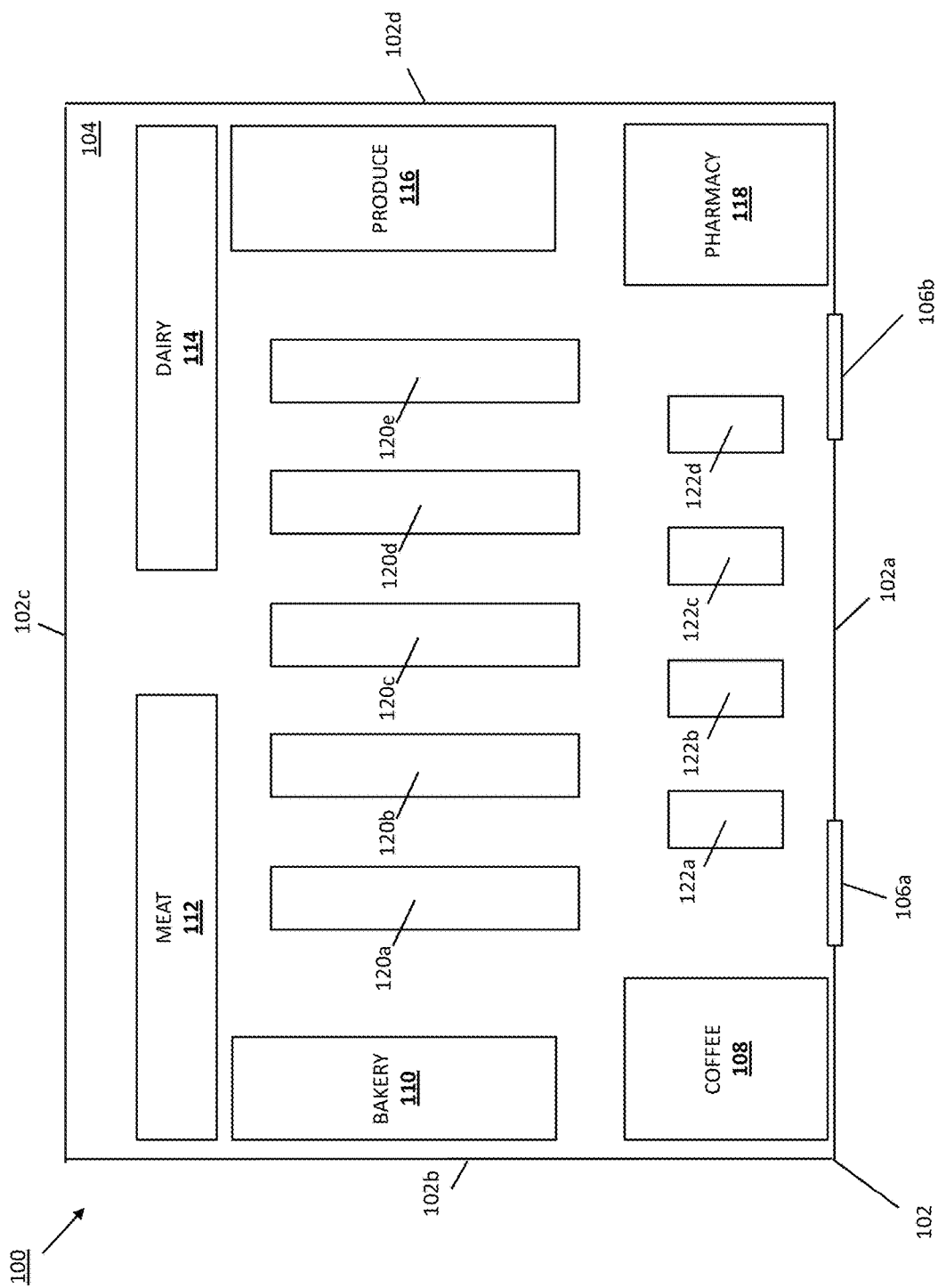
FIG. 1 is a schematic view illustrating an embodiment of a merchant physical location.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for helping a customer with shopping at a merchant physical location. A plurality of beacon devices at the merchant physical location collect customer location information from customer devices that allow the position of customers to be tracked throughout the merchant physical location during customer shopping sessions. A system provider device receiving the customer location information for a given customer may analyze that customer location information to determine areas in the merchant physical location that the customer has not been. The system provider device may then use a variety of merchant information, product information, and/or customer information to select a product in an area of the merchant physical location that the customer has not been, and recommend that product to the customer. For example, the service provider device may determine that the customer has not been in an area where a product is on sale and, in response, recommend that product to the customer. In another example, the service provider device may determine that the customer has not been in an area that includes a product that the customer regularly purchases but has not purchased in a predetermined amount of time and, in response, recommend that product to the customer. In another example, the service provider device may determine that the customer has not been in an area that the customer has regularly visited in previous shopping sessions and, in response, recommend to the customer a product in that area. In another example, the service provider device may determine that the customer has not been in an area that includes a product on a customer shopping list and, in response, recommend that product to the customer.

Referring now to FIG. 1, an embodiment of a merchant physical location 100 is illustrated. The merchant physical location 100 includes a merchant building 102 having a plurality of exterior walls 102a, 102b, 102c, and 102d that define a merchant physical location interior 104 that, in the embodiments illustrated and discussed below, is utilized as a grocery store. However, one of skill in the art in possession of the present disclosure will recognize that the customer shopping help system described herein may be utilized with virtually any merchant physical location such as, for example, an electronics store, a clothing store, a book store, a hardware store, and/or a variety of other merchant physical locations known in the art. The exterior wall 102a includes pair of exterior doors 106a and 106b (e.g., "front" doors in the illustrated embodiment).

In an embodiment, the merchant physical location interior 104 of the merchant physical location 100 includes a plurality of product sections. For example, as discussed above, in the embodiments discussed below the merchant physical location 100 is a grocery store and the merchant physical location interior 104 includes a Coffee section 108, a Bakery section 110, a Meat section 112, a Dairy section 114, a Produce section 116, and a Pharmacy section 118. While a few examples for a grocery store have been provided, one of skill in the art will recognize that any variety of different product sections in any merchant physical location will fall within the scope of the present disclosure. The merchant physical location interior 104 also includes a plurality of product shelves 120a, 120b, 120c, 120d, and 120e, each of which may hold products. The merchant physical location interior 104 also includes a plurality of check-out stands 122a, 122b, 122c, and 122d that may each include systems for allowing customers to purchase products located in the merchant physical location 100.

Figure 2:
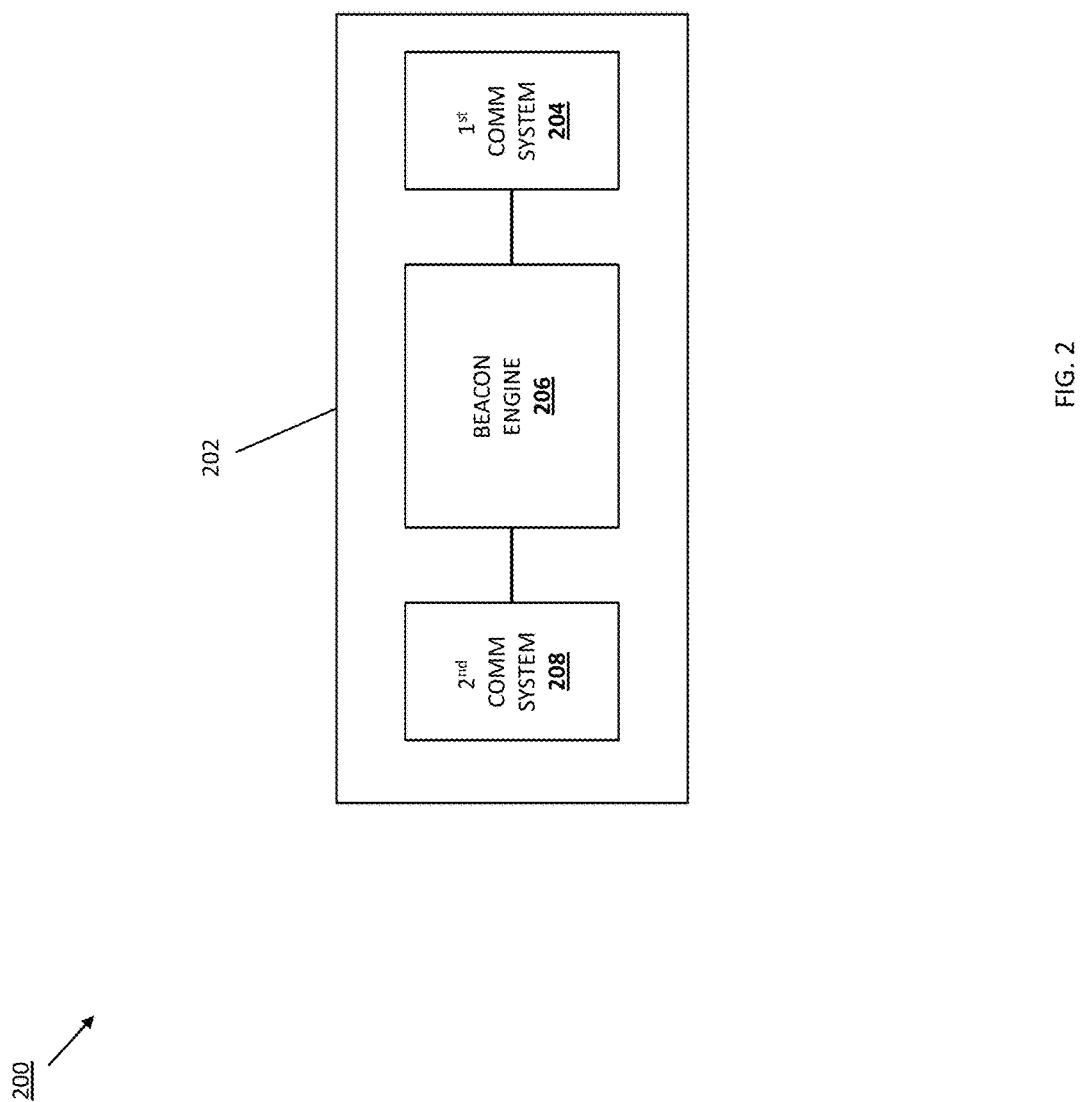
FIG. 2 is a schematic view illustrating an embodiment of a beacon device.

Referring now to FIG. 2, an embodiment of a beacon device 200 is illustrated. The beacon device 200 includes a chassis that houses a first communications system 204 such as, for example, a Wifi communications system. The first communications system 204 is coupled to a beacon engine 206 that may be provided by instruction on a memory system (not illustrated) in the beacon device 200 that, when executed by a processing system (not illustrated) in the beacon device 200, cause the processing system to perform the functions of the beacon device 200 discussed below. The beacon engine 206 is coupled to a second communication system 208 such as, for example, a Bluetooth® Low Energy (BLE) communication system. The beacon engine 206 may be configured to receive any of a variety of sensor signals through the second communication system 208 and transmit those sensor signals using the first communication system 204. While a few examples of communications components in the beacon device 200 have been described, one of skill in the art will recognize that other communications devices, as well as other components that have been omitted for clarity of discussion and illustrated, may be included in the beacon device 200 and will fall within the scope of the present disclosure. One of skill in the art will recognize that the components described above allow for the beacon device to be provided in a relatively small form factor such that it may be placed inconspicuously almost anywhere. As such, the chassis 202 of the beacon device 200 may include any of a variety of features that allow for the coupling of the beacon device to any part of a merchant physical location, discussed below.

Figure 3A:
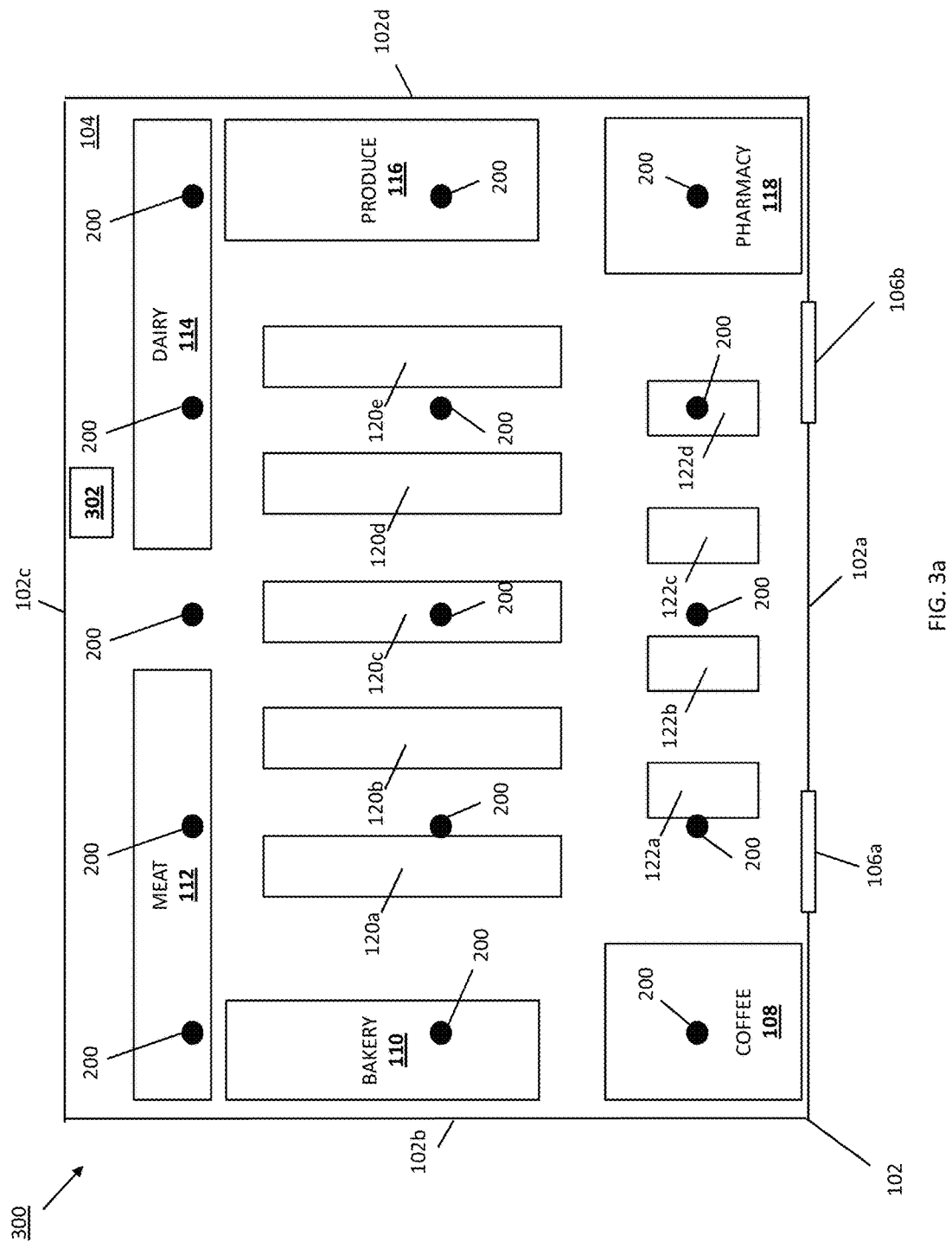
FIG. 3a is a schematic view illustrating an embodiment of a customer shopping help system that includes a plurality of the beacon devices of FIG. 2 in the merchant physical location of FIG. 1.
Figure 3B:
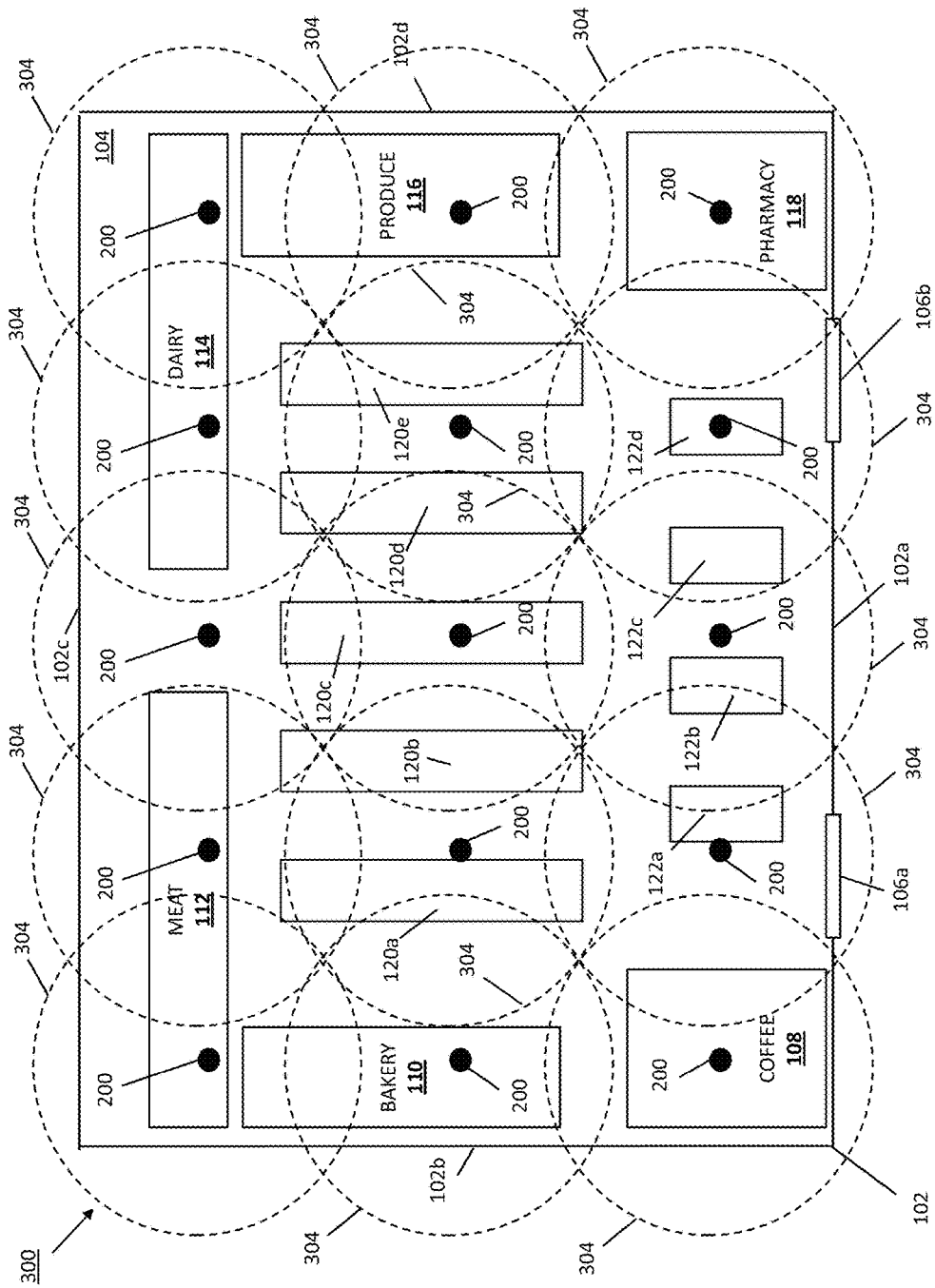
FIG. 3b is a schematic view illustrating an embodiment of the customer shopping help system of FIG. 3a with the beacon devices providing communication areas.

Referring now to FIGS. 3a and 3b, an embodiment of a customer shopping help system 300 is illustrated. As illustrated in FIG. 3a, the customer shopping help system 300 is provided by positioning a plurality of the beacon devices 200, discussed above with reference to FIG. 2, in and around the merchant physical location 100, discussed above with reference to FIG. 1. As discussed above, the beacon devices 200 may be sized such that they may be inconspicuously positioned virtually anywhere in or around the merchant physical location 100. For example, the beacon devices 200 may be positioned on the ceiling of the merchant physical location interior 104, on the product shelves 120a-e, on the check-out stands 122a-d, and/or in any other part of the merchant physical location 100. Each of the beacon devices 200 in the customer shopping help system 300 may be configured to wirelessly communicate, via its first communications system 204, with a merchant network communication device 302 such as, for example, a Wifi wireless router connected to a network such as the Internet.

Referring now to FIG. 3b, in operation, each of the beacon devices 200 is configured to create a communication area 304 with its second communications system 204. For example, the second communications system 204 in each beacon device 200 may be BLE communications device that provides an approximately 100 foot radius communications area. However, other communications systems providing other communications areas are envisioned as falling within the scope of the present disclosure. As can be seen in the illustrated embodiment, the beacon devices 200 may be positioned in and around the merchant physical location 100 such that the communications areas 304 abut, overlap, or otherwise provide coverage for any area of interest within and around the merchant physical location 100. As such, one of skill in the art in possession of the present disclosure will appreciate that different configurations of the beacon devices 200 within and around the merchant physical location 100 may be selected to cover any area within and around the merchant physical location 100 with a communications area 304. As discussed in further detail below, each of the beacon devices 200 are configured to communicate with customer devices within their respective communications area 304 (e.g., using the second communication system 208) to collect information, and then send that information to the merchant network communication device 302 (e.g., using the first communication system 204) such that the data may be provided to a merchant device, a system provider device, and/or any other device operating to provide customer shopping help system discussed below.

In the embodiments illustrated and discussed below, the beacon devices 200 and their communications areas 304 are not illustrated for clarity, but it should be understood that the communications and retrieval of information from beacon communication devices, and the provision of that information to a system provider device, is accomplished using beacon devices providing communications areas such as the beacon devices 200 and communications areas 304 illustrated in FIGS. 3*a* and 3*b*. While a specific example of a customer shopping help system 300 is provided, one of skill in the art in possession of the present disclosure will recognize that a wide variety of different merchant physical locations may incorporate the beacon devices 200 in a variety of manners while remaining within its scope.

In the embodiments discussed below, the customer shopping help systems and methods involve a system provider using a system provider device to retrieve information collected by the beacon devices 200 through a network (e.g., the Internet). In such embodiments, the system provider may associate the merchant physical location 100 (or its merchant), the beacon devices 200, merchant devices, and/or other components of the system with a merchant account in a database located in a database in a non-transitory memory. As such, information received from the beacon devices and merchant devices may be associated with the merchant account in the database, and any results of the analysis of that information may be stored in associated with that merchant account. In other embodiments, the system provider device may be a merchant device that is local to the merchant physical location 100 and that communicates with the beacon devices 200 using the merchant network communication device 302.

In an embodiment, the operation of the customer shopping help system 300 may include providing a map of the merchant physical location 100 and the relative locations of the products provided therein. For example, the dimensions, relative locations, and/or other characteristics of the Coffee section 108, Bakery section 110, Meat section 112, Dairy section 114, Produce section 116, Pharmacy section 118, product shelves 120*a-d*, check-out stands 122*ad*, product advertisements, marketing materials, and/or any other feature in the merchant physical location interior 104 may be provided to the system provider device. As discussed below, the provision of such information to the system provider device allows the system provider device to create and utilize a detailed map, layout, or other reproduction of the merchant physical location interior 104. Furthermore, the positions/locations of products in the merchant physical location interior 104 may also be provided to the system provider device. In one example, the positions/locations of products may be provided by the merchant or a system provider by selecting areas on a map of the merchant physical location 100. In another example, beacon communication devices may be attached to each product, and those beacon communication devices may be configured to report a product identification and a location for each product to the beacon devices 200 (e.g., using a communication systems such as the BLE communications system discussed above.) As discussed below, the provision of such information to the system provider device allows the system provider device to determine the current location of any product in the merchant physical location interior 104. While a few examples of the provision of merchant physical location layout information and product location information to the system provider device have been described, one of skill in the art in possession of the present disclosure will recognize that a wide variety of merchant physical location information, product information, and information provisioning techniques will allow for the functionality of the system provider device discussed below, and thus will fall within the scope of the present disclosure.

Furthermore, FIGS. 1, 3*a*, and 3*b* illustrate a merchant physical location 100 that is a single building, and the beacon devices 200 are positioned to provide communications areas 304 that cover the interior of that single building, and outside sections in the front of that single building. However, beacon devices 200 may be positioned virtually anywhere to retrieve information associated with a merchant physical location. For example, the merchant physical location may be located adjacent to or associated with a parking lot, and beacon devices may be positioned around that parking lot, at the entrances or exits of that parking lot, and/or anywhere else relative to that parking lot in order to collect and send information from customer devices to the system provider device. In another example, the merchant physical location may be located in a mall, and beacon devices may be positioned around that mall, at the entrances or exits of that mall, and/or anywhere else relative to that mall in order to collect and send information from customer devices to the system provider device. In some examples, the first communication system may be connected to Wifi networks available outside the merchant physical location in order to communicate collected information to a system provider device. In other examples, the first communication system may be a cellular communications system that allows the beacon devices to be positioned anywhere in range of a cellular communications tower, allowing beacon devices to be positioned in virtually any physical location when providing the customer shopping help system.

Figure 4:
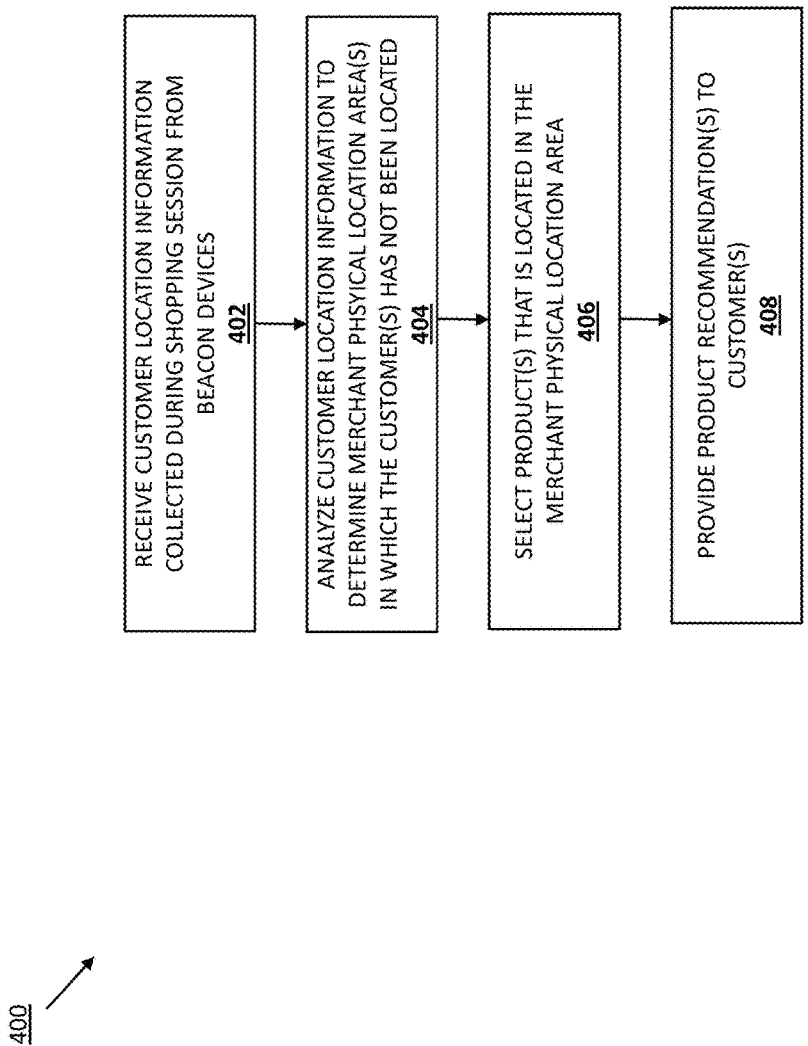
FIG. 4 is a flow chart illustrating an embodiment of a method for providing shopping help to a customer.
Figure 5:
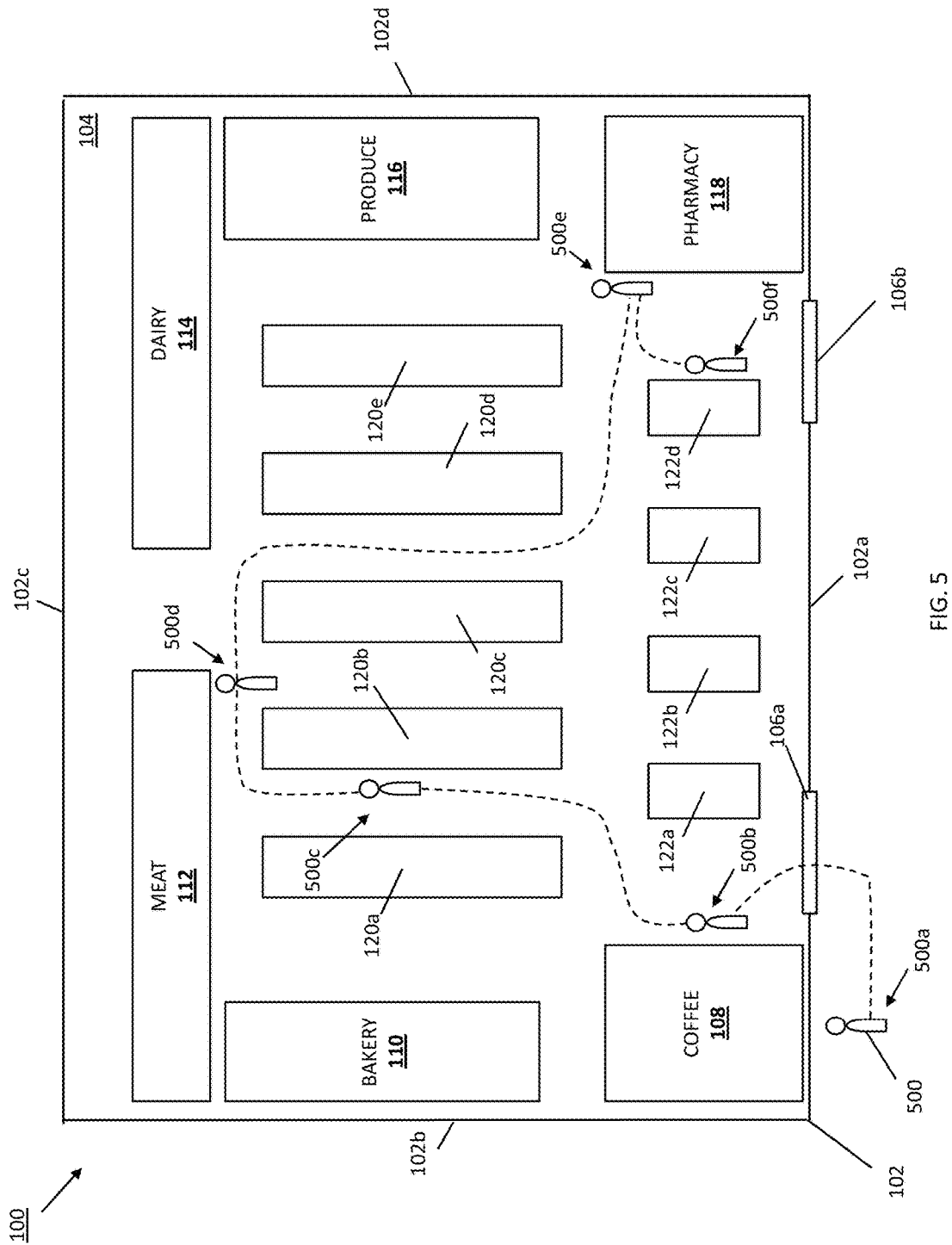
FIG. 5 is a schematic view illustrating an embodiment of a customer moving through the merchant physical location of FIG. 1.

Referring first to FIGS. 4 and 5, an embodiment of a method 400 for providing customer shopping help is illustrated. The method 400 begins at block 402 where customer location information is collected during a customer shopping session from the beacon devices. In an embodiment, a shopping session of a customer may include the detection by the beacon devices 200 of that customer entering the merchant physical location 100, the beacon devices 200 tracking the location of that customer throughout the merchant physical location 100, and the beacon devices 200 detecting that customer leaving the merchant physical locations. For example, a shopping session for a customer may include the period that the customer is detectable by the beacon devices 200. In some embodiments, the shopping session may include a transaction conducted between that customer and the merchant at the merchant physical location 100. For example, a shopping session for a customer may end when that customer makes a purchase from the merchant. However, in other embodiments, a transaction may not be part of the shopping session (e.g., a "window shopping" session). Furthermore, in some embodiments, shopping sessions may include multiple detections of the customer entering and exiting the merchant physical location 100. Further still, as discussed below, a shopping session may be associated with more than one customer. Thus, while a few examples are provided, a shopping session may include any number of customer visits to the merchant physical location 100 that are tracked using the beacon devices and used to determine one or more areas in the merchant physical location 100 that the customer has not been located during that shopping session.

Referring to FIG. 5, an embodiment of the collection of customer location information at block 402 is illustrated. In the embodiments discussed below, the term "customer" is applied to people that conclude a shopping session with a transaction with the merchant at a check-out stand 122*d* in the merchant physical location 100. However, "customer" may also apply to people that simply position themselves within range of a communication area 304 of a beacon device 200 in the merchant physical location 100 (e.g., potential customers, customer that are browsing products in the merchant physical location 100 without actually buying any products, etc.). FIG. 5 illustrates a customer 500 that is initially detected by one or more of the beacon devices 200 at a location 500*a* on an exterior walkway outside of the merchant physical location 100. At block 402, one or more of the beacon devices 200 operate to communicate with a customer device of the customer 500 in order to detect the customer 500 and collect customer location information that may be transmitted to the system provider device and associated with that customer 500 and a merchant account in a database.

In an embodiment, the customer device of the customer 500 may be customer mobile phone that is configured to communicate with the second communications systems 208 in the beacon devices 200 when the customer mobile phone is located in the communications areas 304 of the beacon devices 200. For example, the customer mobile phone may include a BLE communications system that is configured to communicate with the BLE communications systems in the beacon devices 200 when the customer mobile phone is located in the communications areas 304 provided by those beacon devices 200. The BLE communications system in the customer mobile phone may be configured to access any data (e.g., stored in the customer mobile phone, from sensors located in the customer mobile phone, over a network that the customer mobile phone is connected to, in databases accessible by the customer mobile phone over the network, etc.) and provide that data to the beacon devices 200.

In a specific embodiment, the customer shopping help system is provided by a payment service provider such as, for example, PayPal, Inc. of San Jose, Calif., that provides merchant services to allow the merchant to track customer activities, and payment services that allow customers and merchants to perform transactions with each other. In such embodiments, the merchants and customers may include accounts with the payment service provider such that the merchant includes a merchant account with the payment service provider, and each customer includes a respective customer account with the payment service provider. Thus, at block 402, the customer 500 may include a customer account with a payment service provider that providers the customer shopping help system. In some embodiments, the customer mobile phone of the customer 500 may include a payment service application that is linked to a customer account and that provides for automatic communication between the customer mobile phone and beacon devices 200 when the customer mobile phone is located in a communications area 304 provided by the beacon device 200 (e.g., the customer 500 may have previously provided permission for the exchange of data between their customer mobile phone and the beacon devices 200). In other embodiments, the customer mobile phone or payment service application may ask the customer for permission to communicate with the beacon devices 200 upon detecting a communication area 304.

Thus, at block 402, the customer 500 includes a customer device that is communicating with the beacon devices 200 when that customer is located in any of the communications areas 304. At block 402, the customer device of the customer 500 may operate to communicate customer location information available to or determined by the customer device to the beacon devices 200. In an embodiment, the customer device may be a customer mobile phone that communicates location information retrieved from a location determination device (e.g., Global Positioning System (GPS) device) in the customer mobile phone. In another embodiment, the beacon devices 200 may be configured to determine a location of the customer device using, for example, triangulation or other location determination techniques known in the art. As such, as the customer 500 moves through the communication areas 304 provided by the beacon devices 200, customer location information associated with that customer (e.g., retrieved or otherwise determined by the beacon devices 200 from that customers mobile phone) is collected by the beacon devices 200 (e.g., via its first communication system 204) and sent by the beacon devices 200 (e.g., via operation of its beacon engine 206 and use of its second communication system 208) over the network to the system provider device.

FIG. 5 illustrates the customer 500 initially being detected by one or more of the beacon devices 200 at a location 500*a* on an exterior walkway outside of the merchant physical location 100. The movement of the customer 500 throughout the merchant physical location 100 is indicated in FIG. 5 by dashed lines between different areas in the merchant physical location 100 where the customer 500 is detected by the beacon devices 200 as stopping or slowing movement for some period of time. In the illustrated example, the customer 500 is detected by the beacon devices 200 moving through the exterior door 106*a* and to an area 500*b* in the merchant physical location interior 104 that is located adjacent to or within the coffee section 108, then to an area 500*c* in the merchant physical location interior 104 that is located between the product shelves 120*a* and 120*b*, then to an area 500*d* in the merchant physical location interior 104 that is located adjacent to or within the meat section 112, then to an area 500*e* in the merchant physical location interior 104 that is located adjacent to or within the pharmacy section 118, and then to an area 500*d* in the merchant physical location interior 104 that is located adjacent to or within the check-out stand 122*d*.

While a few examples have been illustrated and described, one of skill in the art will recognize how customer location information of customers may be retrieved using beacon devices positioned anywhere in or around the merchant physical location 100 and used to track the location of those customers in, around, and/or relative to the merchant physical location 100. As such, customers may be tracked entering, moving about, parking in, and exiting a parking lot; entering, moving about, and exiting a mall; moving past merchant physical locations; entering, moving about, and existing merchant physical locations; and/or moving through any location covered by a communication area 304 of a beacon device 200. Any location information retrieved from the customer device of a given customer may then be associated with that customer (e.g., via a customer account) and/or the merchant (e.g., via a merchant account) such that for the merchant physical location 100, collected location information associated with any particular customer may be distinguished from collected location information associated with other customers. Thus, while a specific tracked path of the customer 500 is illustrated and used below in providing customer shopping help, one of skill in the art in possession of the present disclosure will recognize that customer location information may describe any path throughout the merchant physical location 100 and may be used to provide the customer shopping help described below.

While the examples above discuss the collection of location information, any information available to the customer device may also be collected. For example, temperature information from temperature sensors, humidity information from humidity sensors, pressure information from pressures sensors, physiological information from physiological sensors, and/or any other sensed information may be communicated from the customer device to the beacon devices 200 in substantially the same manner as discussed above for the location information. Furthermore, multiple different types of sensed information may be collected from a given customer device, allowing that information to be associated (e.g., location and temperature information) such that trends around the merchant physical location 100 (e.g., a temperature profile within the merchant physical location) may be determined.

Figure 6:
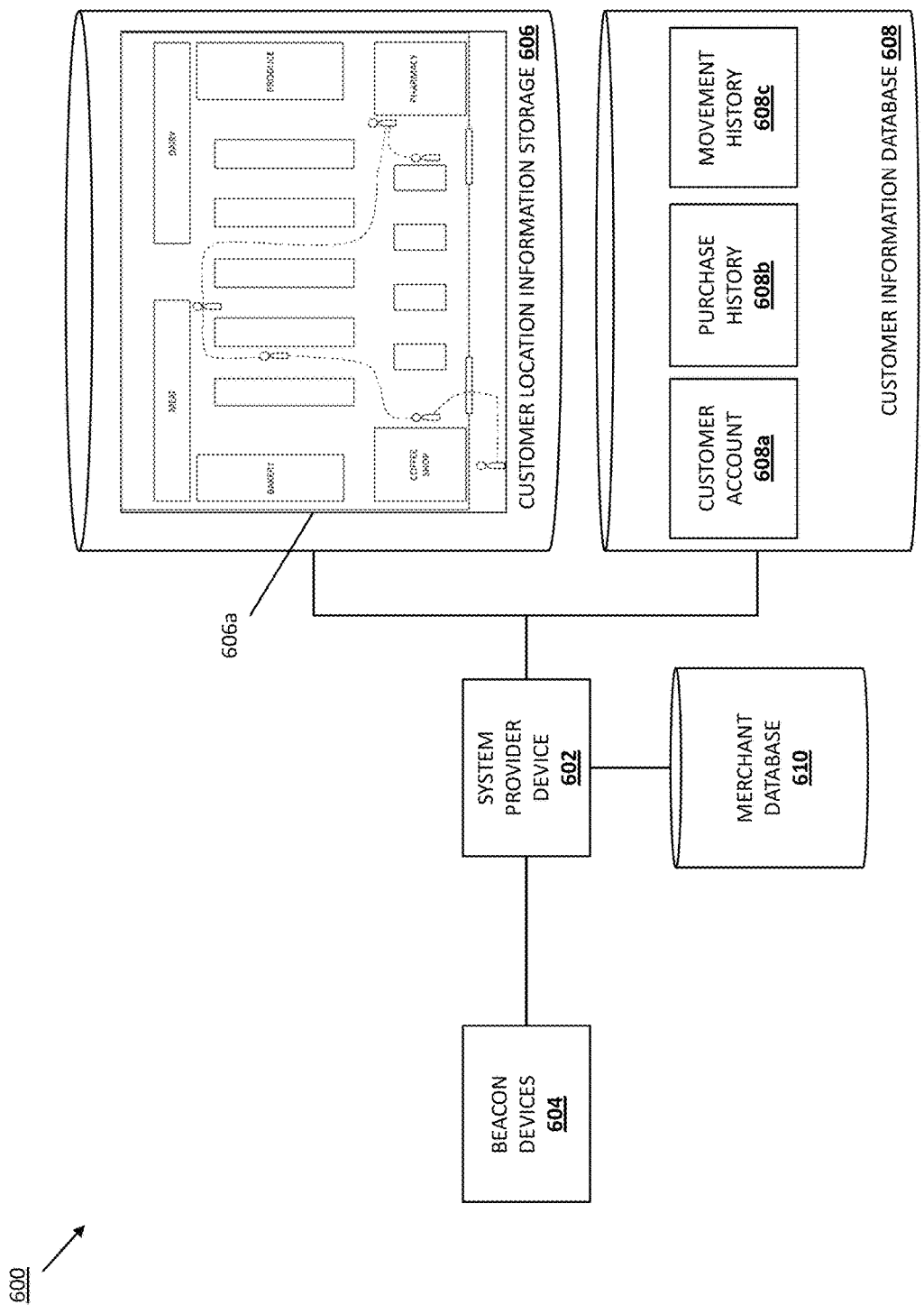
FIG. 6 is a schematic view illustrating an embodiment of a system provider device analyzing the customer movements illustrated in FIG. 5, along with other information, to provide shopping help to a customer.

Referring now to FIGS. 4 and 6, the method 400 the proceeds to block 404 where the customer location information is analyzed to determine merchant physical location area(s) in which the customer has not been located, and then to block 406 where one or more products are selected that are located in those determined merchant physical location area(s). FIG. 6 illustrates a portion of a customer shopping help system 600 that includes a system provider device 602 communicatively coupled to beacon devices 604, a customer location information database 606, a customer information database 608, and a merchant database 610. While illustrated as separate databases, the customer location information database 606, customer information database 608, and merchant database 610 may be the same database and/or may be linked using techniques known in the art.

In an embodiment, the customer location information storage 606 may store customer location information 606a that is collected from customers that are currently involved in a shopping session at the merchant physical location 100 (illustrated in FIG. 6 by graphical data associated with the customer location information collected as described above with reference to block 402). The customer information database 608 includes customer account information 608a, customer purchase history information 608b, customer movement history 608c, and/or a variety of other customer information known in the art, any of which may be linked with any other customer information in the customer information database 608. For example, the customer account information may identify the customer 500, and may be linked to a customer purchase history of the customer 500 that includes transactions between the customer and the merchant at the physical merchant location 100, as well as linked to a customer movement history of the customer 500 that includes customer location information collected during previous shopping sessions by the customer 500 at the merchant physical location 100. The merchant database 610 may include details about the layout of the merchant physical location 100, product identifications, product locations in the merchant physical location 100, the locations of sales in the merchant physical location 100, the positioning of marketing materials in the merchant physical location 100, and/or any other merchant information known in the art.

At block 404, the system provider device may analyze the customer location information 606a to determine merchant physical location areas that are located in the merchant physical location 100 and in which the customer 500 has not been located during their shopping session. At block 606, the system provider device may select one or more products that are located in those merchant physical location areas using any of a variety of information available to the system provider device. While illustrated as separate method blocks, one of skill in the art in possession of the present disclosure will recognize that blocks 404 and 406 may be performed, at least partially, at the same time. A few examples of the variety of information that may be used along with the determined merchant physical location areas (in which the customer 500 has not been located during their shopping session) to select products in those merchant physical location areas are provided below, but one of skill in the art in possession of the present disclosure will recognize that any information available from the customer device (e.g., through the beacon devices 604), from the beacon devices 604 themselves, from the customer location information storage 606, from the customer information database 608, from the merchant database 610, and/or from other information sources may be leverage to select products that may be of interest to the customer 500 and which are located in areas of merchant physical location where the customer has not been during their shopping session.

Figure 7:
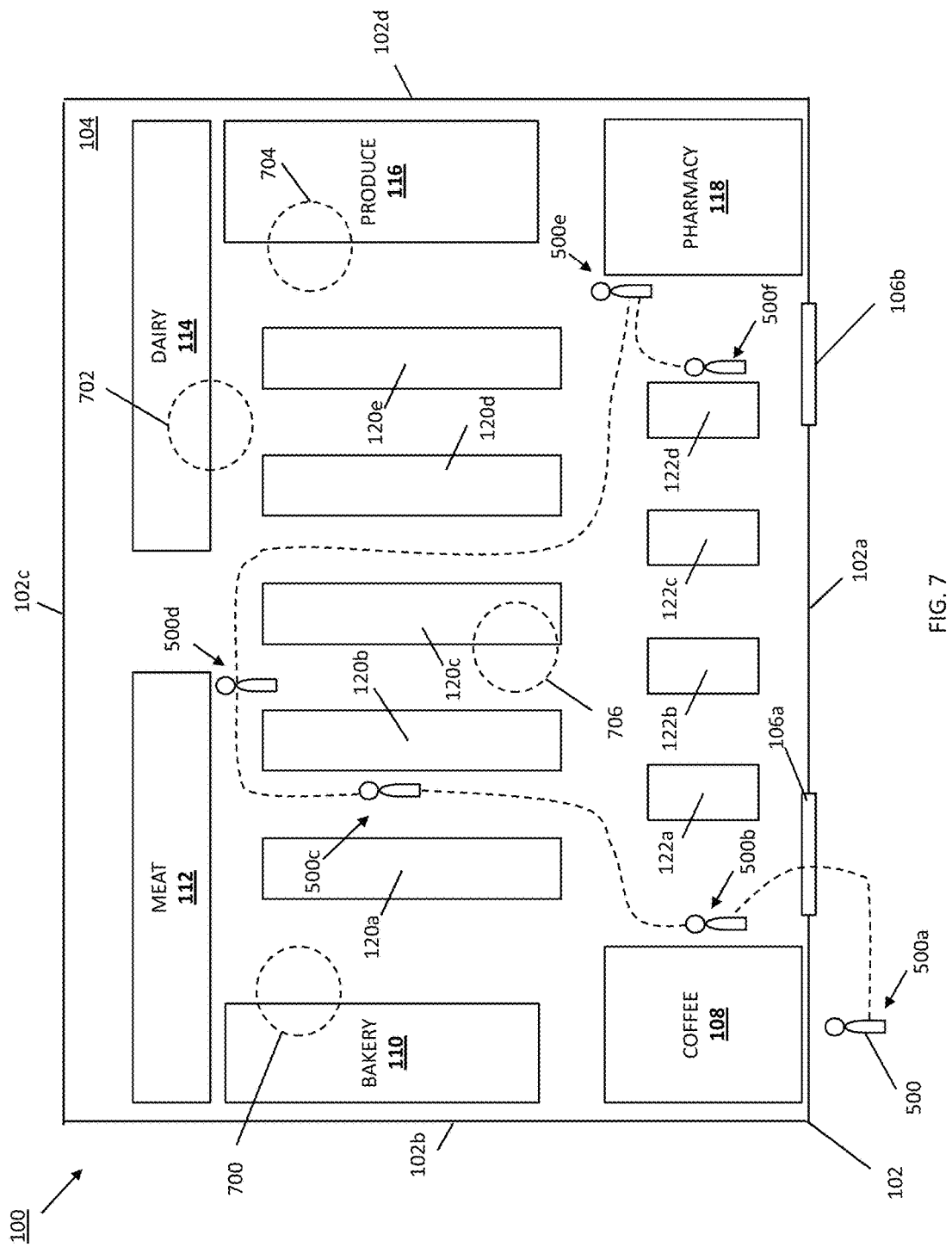
FIG. 7 is a schematic view illustrating an embodiment a plurality of merchant physical location areas that are included in the merchant physical location of FIG. 1 and in which the customer has not been located during a shopping session.

Referring now to FIG. 7, a schematic of the merchant physical location 100, which illustrates the customer location information received at block 402, is provided to illustrate a plurality of merchant physical location areas 700, 702, 704 and 706 that were determined at block 404. In some embodiments, the system provider device may operate to first determine all of the areas in the merchant physical location 100 that the customer 500 has not been located, and then reference other information (e.g., product information, customer information, merchant information, etc.) to select products at block 406 that are included in the merchant physical location areas 700, 702, 704, and 706, discussed in further detail below. However, the determination of merchant physical location areas in the merchant physical location 100 that the customer 500 has not been located in during their shopping session may be performed in a variety of manners while remaining within the scope of the present disclosure.

Following the determination of the merchant physical location areas at block 404 and the selection of product(s) at block 406, the method 400 proceeds to block 408 where product recommendations are provided to customer(s). In an embodiment, the system provider device may operate to send product recommendations over the network to the customer device of the customer 500 for whom the customer location information was collected at block 402. While a few examples are provided below, the selection of products at block 406 and the provision of product recommendations to the customer may be performed in a variety of manners while remaining within the scope of the present disclosure. In the examples discussed below, the customer 500 may position themselves in the area 500f of the merchant physical location 100 that is adjacent to or within the check-out stand 122d (e.g., by stopping or slowly moving near the check-out stand 122d such that it appears that the customer 500 is about to pay for the products they selected and/or leave the merchant physical location 100), and that location of the customer 500 may be reported by the beacon device(s) 200 to the system provider device 602. In response, the system provider device 602 may perform block 408 of the method 400 and send the product recommendation. The product recommendation(s) may be sent a block 408 without any request from the customer 500 (e.g., as a "pop-up", text message, email, or other communication method known in the art). However, in other embodiments, the product recommendation may be sent while the customer 500 is moving through the merchant physical location, based on a request from the customer 500, and/or in a variety of other scenarios while remaining within the scope of the present disclosure.

Referring now to FIGS. 6, 7, and 8a, a customer device 800 is illustrated that is associated with the customer 500 and that includes a display device 800a and an input button 800b. The display device 800a is displaying a product recommendation screen 802 using a product recommendation received at block 408 from the system provider device 602 over the network. The product recommendation screen 802 includes a merchant physical location map 804 that shows the path of the customer 500 through the merchant physical location 100, and includes a merchant physical location area indicator 804a positioned over the portion of the merchant physical location map 804 that depicts the Bakery section 110. The product recommendation screen 802 also includes a product recommendation information area 806. In one example of the illustrated embodiment, at blocks 404 and 406 of the method 400, the system provider device 602 used the customer location information 606a retrieved at block 402 to determine areas in the merchant physical location 100 in which the customer 500 had not been. The system provider device 602 then retrieved merchant information from the merchant database 610 that included the locations of sales, discounted pricing, and/or other product pricing events throughout the merchant physical location 100, and used that merchant information and those determined areas in the merchant physical location 100 to determine that, during their shopping session, the customer 500 had not been located in the merchant physical location area 700 in which a sale, discounted pricing, and/or other product pricing event is occurring. In response, the system provider device creates a product recommendation that is sent to the customer device 800 such that the product recommendation screen 802 is displayed.

As can be seen in the embodiment illustrated in FIG. 8a, the product recommendation information area 806 informs the customer 500 that, based on the customer location information received during their shopping session, they missed a sale in the Bakery section 110 of the merchant physical location 100, and includes sale details ("HALF PRICE ON ALL STORE-BAKED GOODS") along with images of the products for sale. In addition, the product recommendation information area 806 informs the customer that the merchant physical location area indicator 804a is provided on the merchant physical location map 804 to indicate where the sale is located, which allows the customer 500 to use their current location (depicted on the merchant physical location map 804 at the end of the customer shopping session path) to determine how to find the sale in the merchant physical location 100. While the embodiment associated with FIG. 8a is discussed as recommending to the customer that they visit the merchant physical location area 700 based only on a sale occurring there, other information (e.g., information used in the embodiments discussed below) may be used to make the product recommendation. For example, a customer purchase history and/or customer movement history may indicate that the customer 500 typically buys the product(s) that are on sale in the merchant physical location area 100, and that information may be used along with the sale information to determine that the product recommendation should be provided to the customer.

Figure 8B:
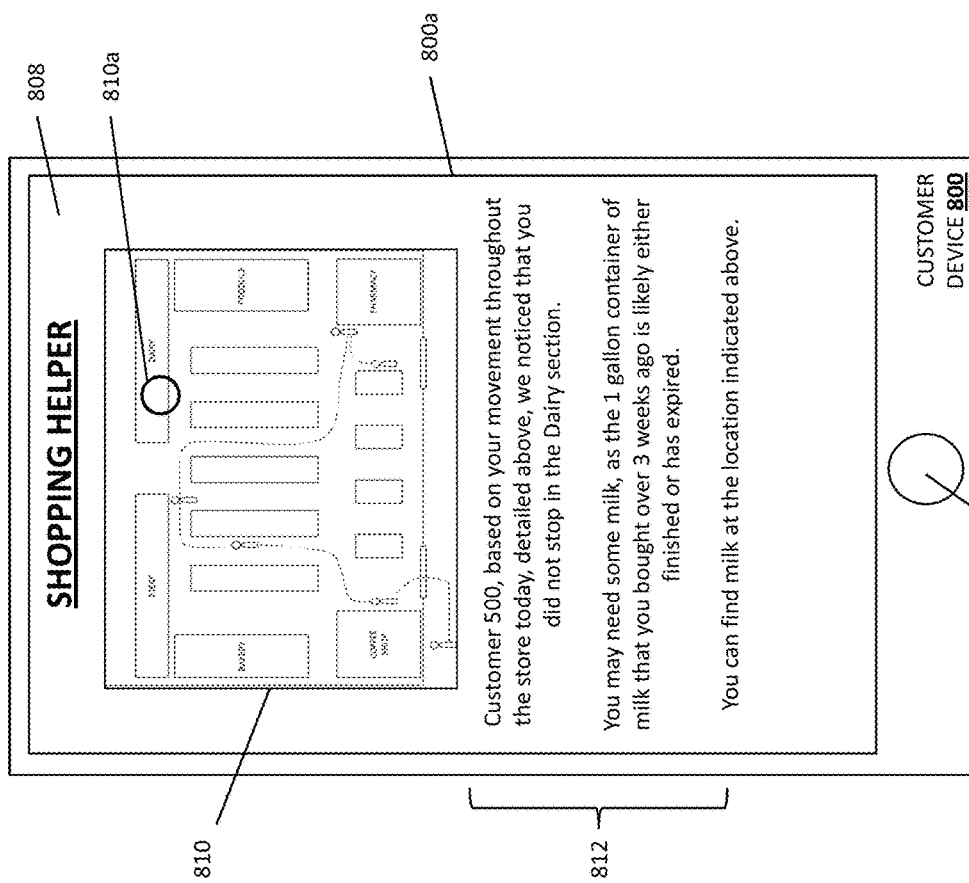
FIG. 8b is a front view illustrating an embodiment of a customer device displaying a product recommendation screen.

Referring now to FIGS. 6, 7, and 8b, the display device 800a on the customer device 800 is illustrated displaying a product recommendation screen 808 using a product recommendation received at block 408 from the system provider device 602 over the network. The product recommendation screen 808 includes a merchant physical location map 810 that shows the path of the customer 500 through the merchant physical location 100, and includes a merchant physical location area indicator 810a positioned over the portion of the merchant physical location map 810 that depicts the Dairy section 114. The product recommendation screen 802 also includes a product recommendation information area 812. In one example of the illustrated embodiment, at blocks 404 and 406 of the method 400, the system provider device 602 used the customer location information 606a retrieved at block 402 to determine areas in the merchant physical location 100 in which the customer 500 had not been during their shopping session. The system provider device 602 then retrieved customer information (e.g., purchase history information 608b) from the customer information database 608 that includes previous purchases of product types by the customer 500, and used that customer information and those determined areas in the merchant physical location 100 to determine that, during their shopping session, the customer 500 had not been in the merchant physical location area 702 in which a product type that the customer 500 typically purchases is located, but that the customer 500 has not purchased in a particular time period. In response, the system provider device creates a product recommendation that is sent to the customer device 800 such that the product recommendation screen 808 is displayed.

As can be seen in the embodiment illustrated in FIG. 8b, the product recommendation information area 812 informs the customer 500 that, based on the customer location information received during their shopping session, they did not visit the Dairy section 114, and informs them that their last purchase of milk indicates that they likely need to purchase milk during their current shopping session. In some embodiments, the system provider device may determine that the last purchase of a product type is associated with a product including an expiration date, and that the time period that has passed since their last purchase of the product is within a predetermined amount of or exceeds that expiration date. In such embodiments, the product recommendation may be made based on that determination (e.g., that the last purchase of milk is associated with a date that indicates that milk is about to, or has already, exceeded its expiration date). In addition, the product recommendation information area 812 informs the customer that the merchant physical location area indicator 810a is provided on the merchant physical location map 810 to indicate where the milk located in the merchant physical location 100, which allows the customer 500 to use their current location (depicted on the merchant physical location map 810 at the end of the customer shopping session path) to determine how to find the milk in the merchant physical location 100. While the embodiment associated with FIG. 8b is discussed as recommending to the customer that they visit the merchant physical location area 702 based only on a product being located there that a customer purchase history indicates the customer typically buys but has not bought in a particular time period, other information (e.g., information discussed in the embodiments herein) may be used to make the product recommendation. For example, merchant information and/or a customer movement history may indicate that there is a sale on milk in the merchant physical location 100, and that information may be used along with the purchase history information to determine to provide the product recommendation.

Figure 8C:
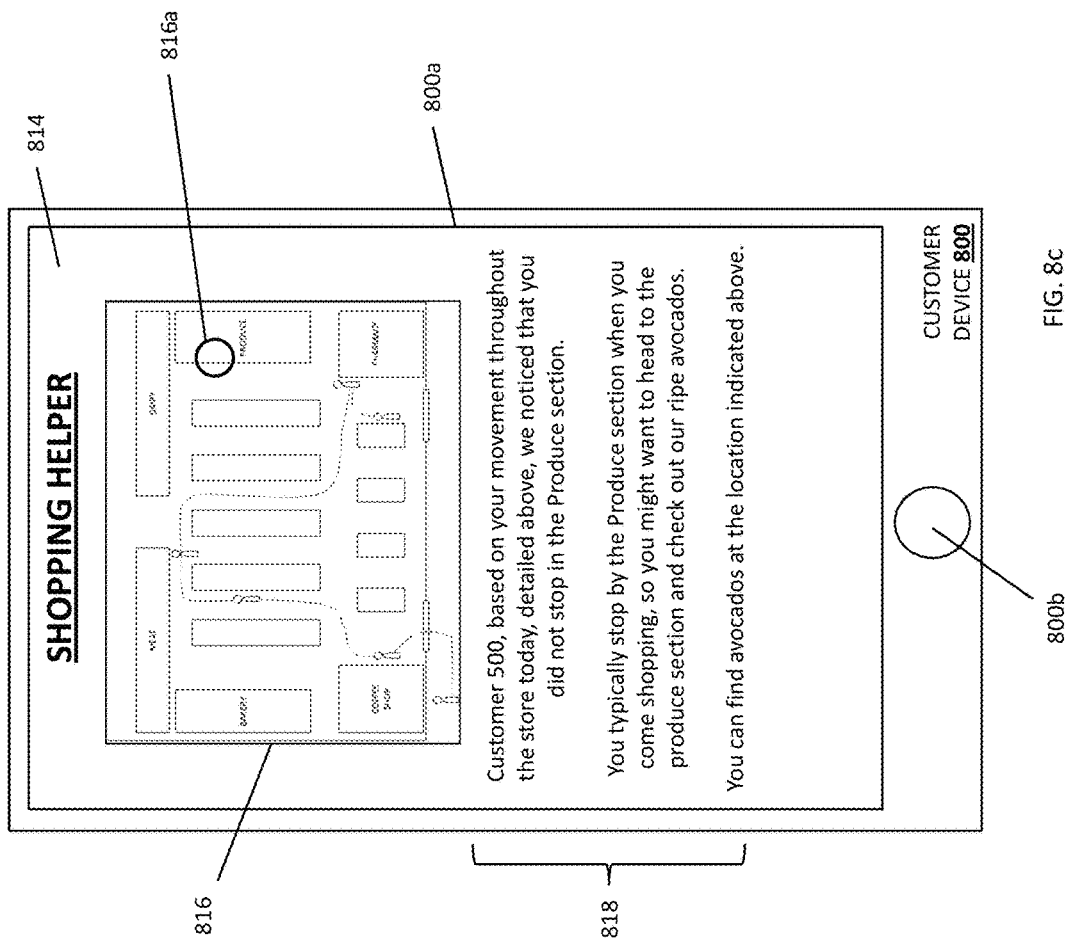
FIG. 8c is a front view illustrating an embodiment of a customer device displaying a product recommendation screen.

Referring now to FIGS. 6, 7, and 8c, the display device 800a on the customer device 800 is illustrated displaying a product recommendation screen 814 using a product recommendation received at block 408 from the system provider device 602 over the network. The product recommendation screen 814 includes a merchant physical location map 816 that shows the path of the customer 500 through the merchant physical location 100, and includes a merchant physical location area indicator 816a positioned over the portion of the merchant physical location map 810 that depicts the Produce section 116. The product recommendation screen 814 also includes a product recommendation information area 818. In one example of the illustrated embodiment, at blocks 404 and 406 of the method 400, the system provider device 602 used the customer location information 606a retrieved at block 402 to determine areas in the merchant physical location 100 in which the customer 500 had not been. The system provider device 602 then retrieved customer information (e.g., movement history information 608c that includes the movement patterns of the customer 500 saved from previous shopping sessions), and used that customer information and those determined areas in the merchant physical location 100 to determine that, during their shopping session, the customer 500 had not been in the merchant physical location area 704 that the customer 500 typically stops in such that that customer is located adjacent product in that merchant physical location area 704. In response, the system provider device creates a product recommendation that is sent to the customer device 800 such that the product recommendation screen 814 is displayed.

As can be seen in the embodiment illustrated in FIG. 8c, the product recommendation information area 818 informs the customer 500 that, based on the customer location information received during their shopping session, they did not visit the Produce section 116. The product recommendation information area 818 also informs the customer 500 that during their current shopping session they did not stop in the Produce section 116, which they have regularly stopped in during their previous shopping sessions. In one example, the system provider device may have reviewed merchant information from the merchant database 610 to determine that the Produce section 116 currently includes ripe avocados, and the product recommendation information area 818 may recommend avocados to the customer 500. In another example, the system provider device may have reviewed customer information from the customer information database 608 to determine that the customer regularly purchases avocados, and the product recommendation information area 818 may recommends avocados to the customer 500. In addition, the product recommendation information area 818 informs the customer that the merchant physical location area indicator 816a is provided on the merchant physical location map 816 to indicate where the avocados are located in the merchant physical location 100, which allows the customer 500 to use their current location (depicted on the merchant physical location map 816 at the end of the customer shopping session path) to determine how to find the avocados in the merchant physical location 100.

Figure 8D:
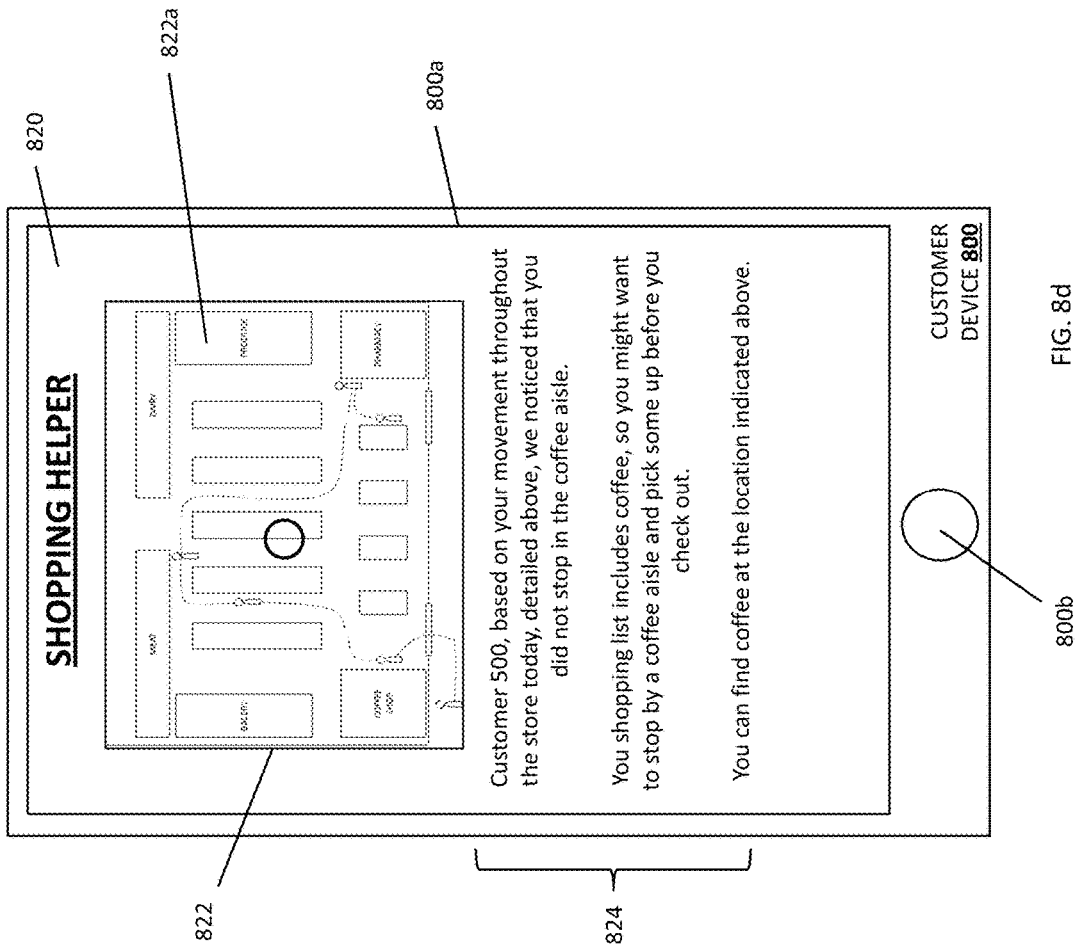
FIG. 8d is a front view illustrating an embodiment of a customer device displaying a product recommendation screen.

Referring now to FIGS. 6, 7, and 8d, the display device 800a on the customer device 800 is illustrated displaying a product recommendation screen 820 using a product recommendation received at block 408 from the system provider device 602 over the network. The product recommendation screen 820 includes a merchant physical location map 822 that shows the path of the customer 500 through the merchant physical location 100, and includes a merchant physical location area indicator 822a positioned over the portion of the merchant physical location map 822 that depicts a portion of the product shelf 120c. The product recommendation screen 820 also includes a product recommendation information area 824. In one example of the illustrated embodiment, at blocks 404 and 406 of the method 400, the system provider device 602 used the customer location information 606a retrieved at block 402 to determine areas in the merchant physical location 100 in which the customer 500 had not been. The system provider device 602 then retrieved customer information (e.g., a customer shopping list from the customer device 800), and used that customer information and those determined areas in the merchant physical location 100 to determine that, during their shopping session, the customer 500 had not been in the merchant physical location area 706 that includes a product on the customer shopping list. In response, the system provider device creates a product recommendation that is sent to the customer device 800 such that the product recommendation screen 820 is displayed.

As can be seen in the embodiment illustrated in FIG. 8d, the product recommendation information area 824 informs the customer 500 that, based on the customer location information received during their shopping session, they did not visit the portion of the product shelf 120c that includes coffee, and informs them that coffee is on their shopping list. In addition, the product recommendation information area 824 informs the customer that the merchant physical location area indicator 822a is provided on the merchant physical location map 822 to indicate where the coffee is located in the merchant physical location 100, which allows the customer 500 to use their current location (depicted on the merchant physical location map 816 at the end of the customer shopping session path) to determine how to find the coffee in the merchant physical location 100.

Referring now to FIGS. 6, 7, and 8e, the display device 800a on the customer device 800 is illustrated displaying a shopping list product location screen 826 that may be provided by the system provider device 602 to the customer device 800 over the network using the systems and methods discussed above. The shopping list product location screen 826 includes a merchant physical location map 828 that shows the path of the customer 500 through the merchant physical location 100, and includes merchant physical location area indicators A, B, C, D, E and F positioned over different portions of the merchant physical location map 822. The shopping list product location screen 826 also includes a shopping list 830. In one example of the illustrated embodiment, the system provider device may operate to retrieve a shopping list that is stored on the customer device 800 and use that shopping list to determine the merchant physical location areas in the merchant physical location 100 that includes the products on the shopping list. The shopping list 803 may then be provided with reference characters adjacent each product (e.g., A-F in the shopping list 830) that corresponds to the merchant physical location area indicators A, B, C, D, E and F on the merchant physical location map 828. Thus, the customer 500 may view the shopping list product location screen 820 to determine where in the merchant physical location 100 any product on the shopping list 830 is located. Furthermore, the shopping list 830 may be editable such that the customer may remove products and, in response, have the merchant physical location area indicator for that product removed from the merchant physical location map 828.

In an embodiment, the customer shopping help systems discussed above may also be utilized to perform a transaction between the customer 500 and the merchant at the merchant physical location 100. As discussed above, each beacon device 200 provides a communication area 304 that may, for example, include a 100 foot diameter. However, any of the beacon devices 200 may be throttled, modified, or otherwise adjusted to reduce the size of their associated communication area 304 (e.g., by adjusting the power provided to the beacon device 200, adjusting the operation of a communication system, etc.). For example, the operation of the second communication system 208 in a beacon device 200 may be adjusted to reduce the diameter of the communication area 304 from a 100 foot radius to an approximately 2-3 foot radius such that only a single customer device may communicate with that beacon device 200.

Referring to the embodiment illustrated in FIG. 7, when the customer 500 is positioned in area 500f of the merchant physical location 100 in order to conduct a payment transaction with the merchant to purchase product(s) selected at the merchant physical location 100, the beacon device 200 located at the check-out stand 122d may be adjusted to reduce the size of its communication area 304 until only the customer device of the customer 500 is communicating with that beacon device 200. By providing such communications between the beacon device 200 at the check-out stand 122d and the customer 500 at area 500f, a payment transaction may then be conducted between a merchant device coupled to that beacon device 200 and the customer device of the customer 500 by exchanging payment or identifier data that is known in the art. Furthermore, because beacon devices 200 are located throughout the merchant physical location 100, similar operations may be conducted with beacon devices 200 at any of the check-out stands 122a-c, the coffee section 108, the bakery section 110, the meat section 112, the dairy section 114, the produce section 116, the pharmacy section 118, and/or anywhere else in or around the merchant physical location 100.

Figure 9:
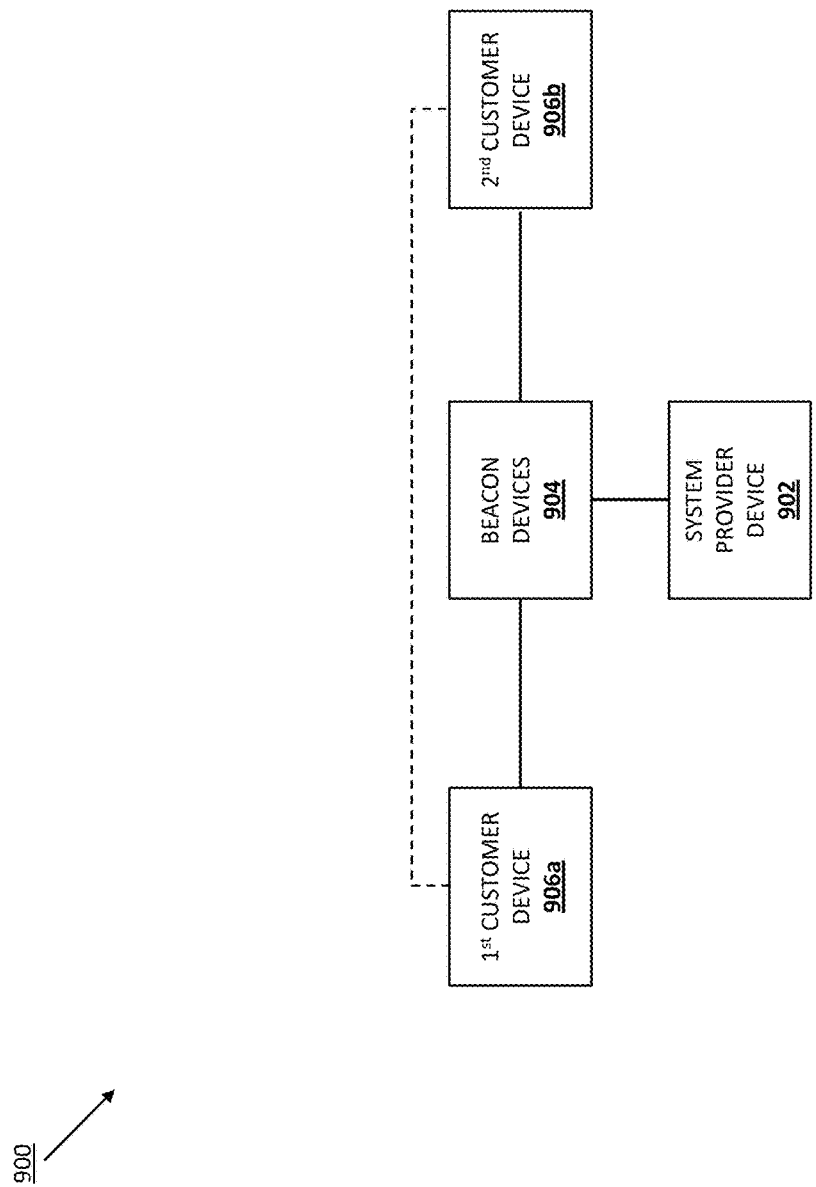
FIG. 9 is a schematic view illustrating an embodiment of a plurality of linked customer devices.

While the embodiments discussed above involved the tracking of a single customer 500 through the merchant physical location 100, any number of customers may be simultaneously tracked through the merchant physical location such that each customer may be provided shopping help substantially as discussed above. Furthermore, multiple customers may be linked such that the locations of those multiple customers in the merchant physical location 100 may be used to provide product recommendations. Referring to FIG. 9, a customer device linking system 900 is illustrated that includes a system provider device 902 communicatively coupled to the beacon devices 904 that are communicating with each of a first customer device 906a and a second customer device 906b that are linked to each other (illustrated by the dashed line). The first customer device 906a and the second customer device 906b may be linked based on instructions from either or both of the customers devices 906a and 906b, based on linked customer device identifiers stored by the system provider device 902, based on customer location information received by the beacon devices 904 from the customer devices 906a and 906b that indicates that their associated customers entered the merchant physical location 100 together, and/or using any other linking instructions, techniques, or information known in the art. The linking of the customer devices 906a and 906b may provide benefits when two customers are shopping together for products, as detailed below.

Figure 10:
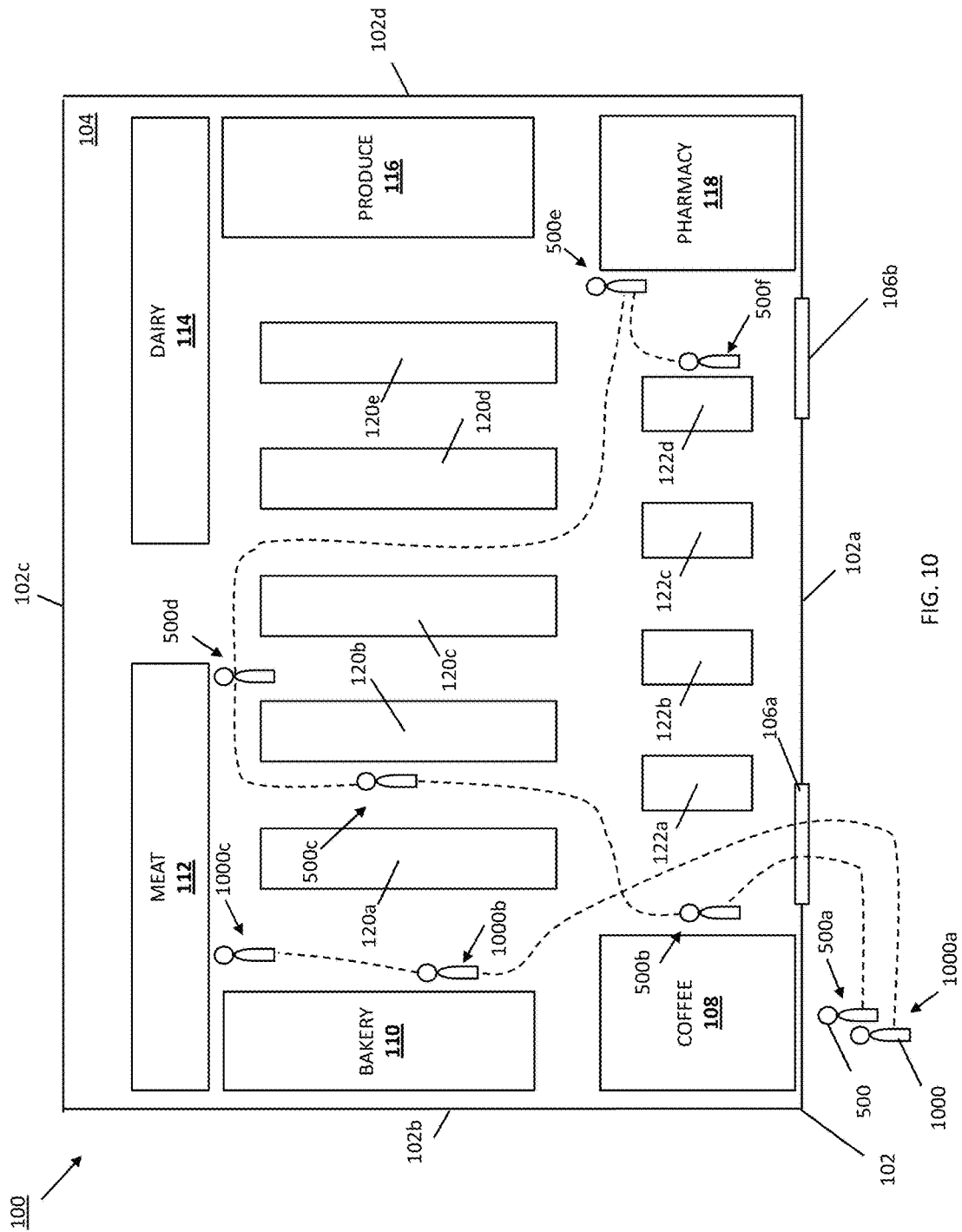
FIG. 10 is a schematic view illustrating an embodiment of a plurality of customers moving through the merchant physical location of FIG. 1.

FIG. 10 illustrates the customer 1000, along with the customer 500, initially being detected by one or more of the beacon devices 200 at a location 1000a on the exterior walkway outside of the merchant physical location 100. In an embodiment, upon detection of the customers 500 and 1000 via communication between their customer devices and the beacon devices 200, the proximity of the customers 500 and 1000 may be analyzed and used to determine whether to link their customer devices as illustrated in FIG. 9. The movement of the customer 1000 throughout the merchant physical location 100 is indicated by dashed lines in FIG. 10 between the different areas in the merchant physical location 100 where the customer 1000 is detected by the beacon devices 200 as stopping or slowing movement for some period of time. In the illustrated example, the customer 1000 is detected by the beacon devices 200 moving through the exterior door 106a and to an area 1000b in the merchant physical location interior 104 that is located adjacent to or within the Bakery section 110, and then to an area 1000c that is located adjacent to or within the Meat section 112.

Referring now to FIGS. 6, 7, and 11a, the display device 800a on the customer device 800 is illustrated displaying a product recommendation screen 1100 using a product recommendation received at block 408 from the system provider device 602 over the network. The product recommendation screen 1100 includes a merchant physical location map 1102 that shows the paths of the customers 500 and 1100 through the merchant physical location 100, and includes a merchant physical location area indicator 1102a positioned over the portion of the merchant physical location map 822 that depicts a portion of the product shelf 120c. The product recommendation screen 1100 also includes a product recommendation information area 1104. In one example of the illustrated embodiment, at blocks 404 and 406 of the method 400, the system provider device 602 used the customer location information retrieved at block 402 from both the customer 500 and the customer 1100 to determine areas in the merchant physical location 100 in which neither of the customers 500 and 1000 had been. The system provider device 602 then retrieved customer information (e.g., a customer shopping list from the customer device 800), and used that customer information and those determined areas in the merchant physical location 100 to determine that, during their shopping session, neither of the customers 500 and 1100 had been in the merchant physical location area 706 that includes a product on the customer shopping list. In response, the system provider device creates a product recommendation that is sent to the customer device 800 such that the product recommendation screen 1100 is displayed.

As can be seen in the embodiment illustrated in FIG. 11a, the product recommendation information area 1104 informs the customer 500 that, based on the customer location information received from the customer 500 and the customer 1100 during their shopping session, they did not visit the portion of the product shelf 120c that includes coffee, and informs them that coffee is on their shopping list. In addition, the product recommendation information area 1104 informs the customer 500 that the merchant physical location area indicator 1102a is provided on the merchant physical location map 1102 to indicate where the coffee is located, which allows the customer 500 to determine how to find the coffee in the merchant physical location 100.

In the illustrated embodiment, the product recommendation screen 1100 also includes a linked customer messaging button 1106 that allows the customer 500 to send messages to the customer 1100. Referring now to FIG. 11b, the product recommendation screen 1100 is illustrated following the customer 500 selecting the linked customer messaging button 1106. In response to the selection of the linked customer messaging button 1106, a linked customer indicator 1102b is added to the merchant physical location map 1102, and a messaging section 1108 is provided that indicates that the current location of the customer 1110 is indicated by the linked customer indicator 1102b on the merchant physical location map 1102, while also providing a messaging input box and keypad that allows the customer 500 to send a message to the customer 1100 (e.g., "I'm ready to go—get coffee and creamer on product shelf 120c on your way to check-out stand 122d"). In an embodiment, the messaging input box may be prefilled using the information determined for the product recommendation and provided on the product recommendation screen 1100 of FIG. 11a.

Figure 12:
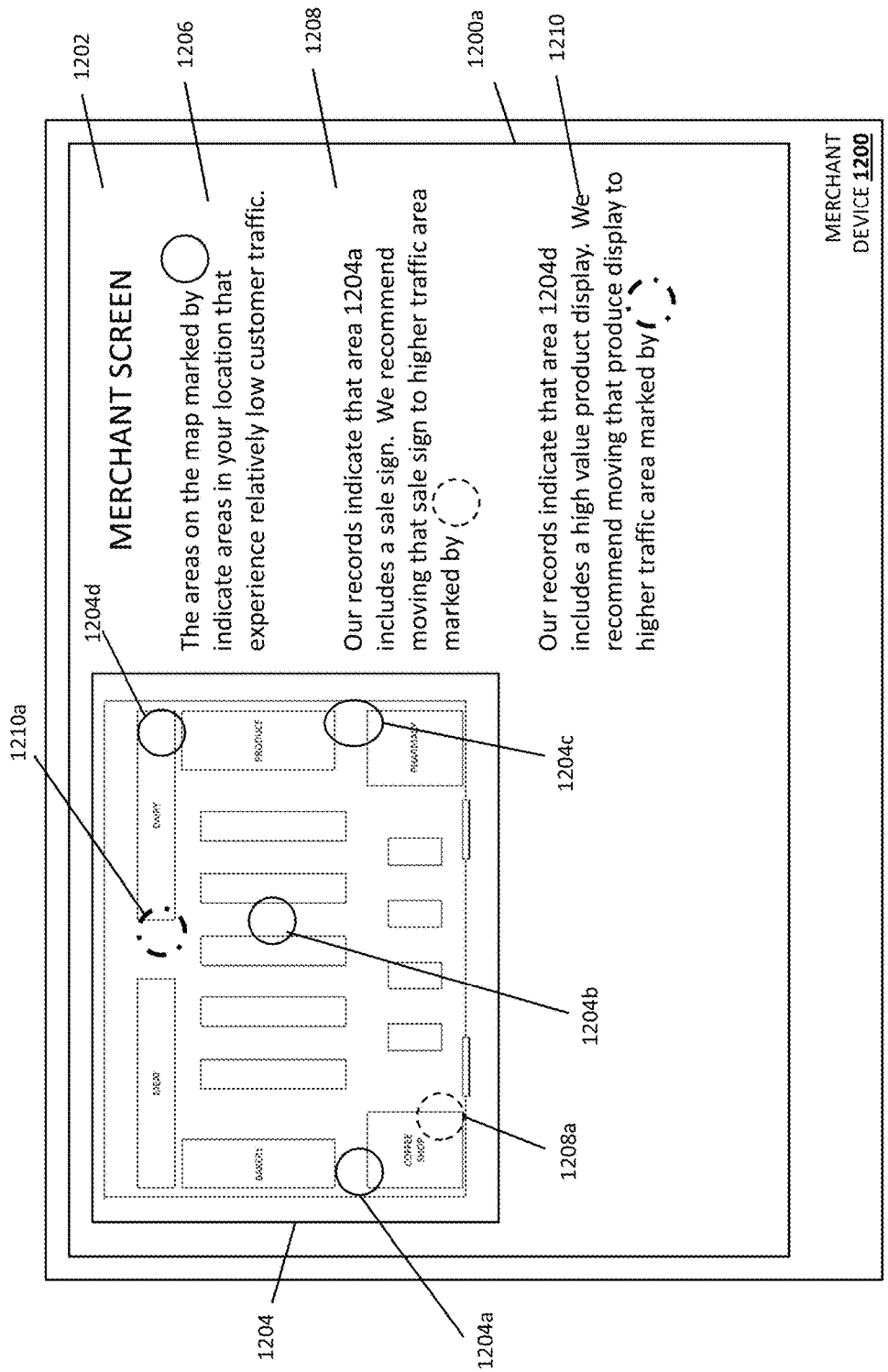
FIG. 12 is a front view illustrating an embodiment of a merchant device displaying a merchant screen.

Referring now to FIG. 12, a merchant device 1200 including a display device 1200a that is displaying a merchant screen 1202 is illustrated. The merchant screen 1202 is provided to illustrate an example of how the information collected and analyzed for the method 400 may be used to provide information to the merchant at the merchant physical location 100. In the illustrated embodiment, the customer location information collected from a plurality of different customers during their respective shopping sessions has been analyzed to determine areas in the merchant physical location 100 that receive the least customer traffic (e.g., customer location information across a plurality of different customer shopping sessions that indicates that customers are located in those areas less often than other areas in the merchant physical location.) The system provider device may then access merchant information to make recommendations to the merchant based on the areas that are determined in the merchant physical location 100 to receive the least customer traffic.

In the illustrated example, the merchant screen 1202 includes a merchant physical location map 1204 with a plurality of merchant physical location area indicators 1204a, 1204b, 1204c, and 1204d that indicate the areas in the merchant physical location 100 that were determined to receive the least customer traffic. The merchant screen 1202 also includes an area indicator information section 1206 that informs the merchant that the merchant physical location area indicators 1204a, 1204b, 1204c, and 1204d on the merchant physical location map 1204 indicate areas in the merchant physical location 100 that receive relatively low traffic. The merchant screen 1202 also includes an first merchant recommendation section 1208 that informs the merchant that an area in the merchant physical location 100 indicated by the merchant physical location area indicator 1204a includes a sale sign that should be moved to a higher traffic area in the merchant physical location 100 indicated by a merchant physical location area indicator 1208a. The merchant screen 1202 also includes an second merchant recommendation section 1210 that informs the merchant that an area in the merchant physical location 100 indicated by the merchant physical location area indicator 1204d includes a high value product display that should be moved to a higher traffic area in the merchant physical location 100 indicated by a merchant physical location area indicator 1210a.

Thus, systems and methods for providing customer shopping help recommendations have been described that utilize a network of beacon devices that are configured to communication with customer devices. The communication between the customer devices and the beacon devices collects any information that sensors in the customer devices can sense, and in specific embodiments, collects customer location information for the customers in and around a merchant physical location to track the locations of the customers and analyze their changing locations to determine areas in the merchant physical location that the customer have not been so that those customers may be helped with shopping within the merchant physical location. The systems and methods described herein may utilize a variety of merchant and customer information to determine products that are located in the areas in the merchant physical location where the customers have not been so that those products may be recommended to those customers.

Figure 13:
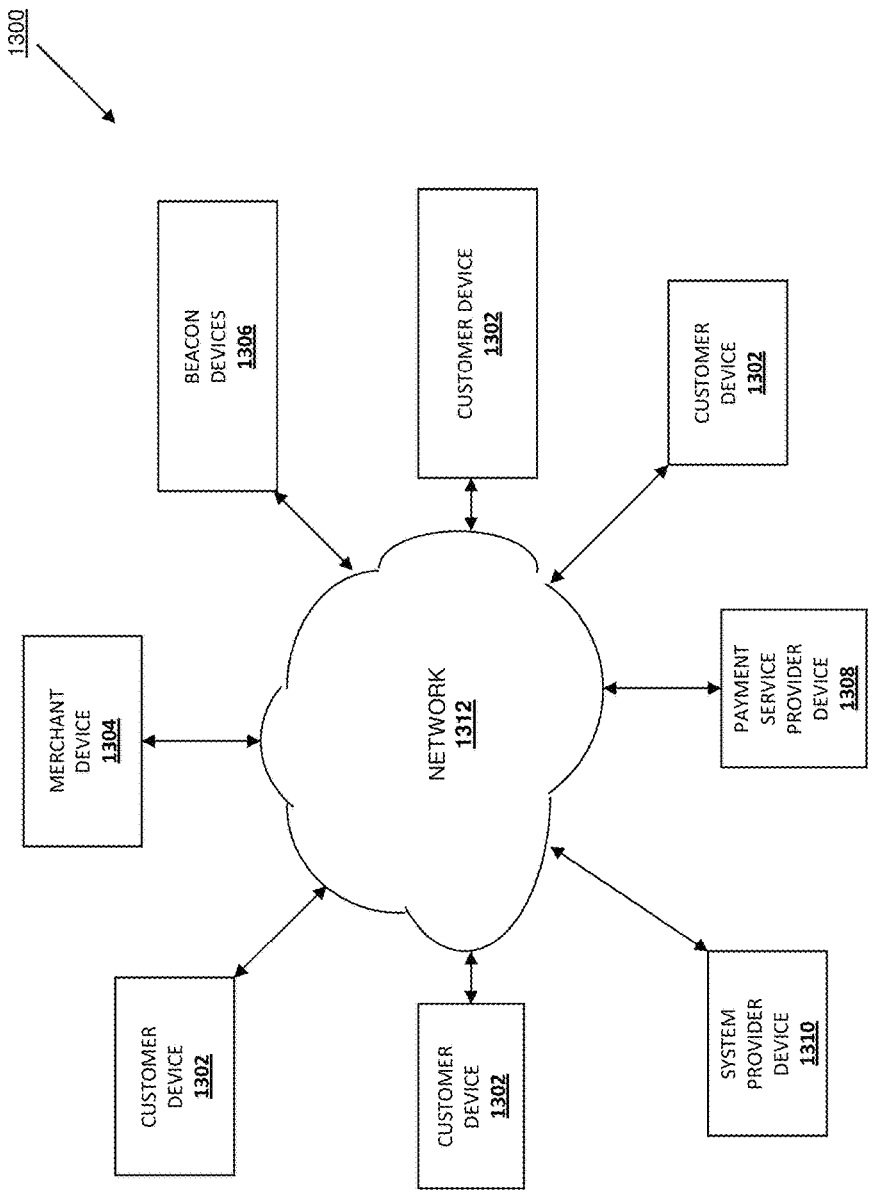
FIG. 13 is a schematic view illustrating an embodiment of a networked system.

Referring now to FIG. 13, an embodiment of a network-based system 1300 for implementing one or more processes described herein is illustrated. As shown, the network-based system 1300 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 13 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1300 illustrated in FIG. 13 includes a plurality of customer devices 1302, a merchant device 1304, a plurality of beacon devices 1306, a payment service provider device 1308, and/or a system provider device 1310 in communication over one or more networks 1312. The customer devices 1302 may be the customer devices discussed above and may be operated by the customers discussed above. The merchant devices 1304 and beacon devices 1306 may be the merchant devices and beacon devices discussed above and may be operated by the merchants discussed above. The payment service provider device 1308 may be the payment service provider devices discussed above and may be operated by a payment service provider such as, for example, PayPal Inc. of San Jose, Calif. The system provider devices 1310 may be the system provider devices discussed above and may be operated by the system providers discussed above.

The customer devices 1302, merchant device 1304, beacon devices 1306, payment service provider device 1308, and/or system provider device 1310 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1300, and/or accessible over the network 1312.

The network 1312 may be implemented as a single network or a combination of multiple networks. For example, in various embodiments, the network 1312 may include the Internet and/or one or more intranets, landline networks, wireless networks, and/or other appropriate types of networks.

The customer devices 1302 may be implemented using any appropriate combination of hardware and/or software configured for wired and/or wireless communication over network 1312. For example, in one embodiment, the customer devices 1302 may be implemented as a personal computer of a user in communication with the Internet. In other embodiments, the customer devices 1302 may be a smart phone, personal digital assistant (PDA), laptop computer, and/or other types of computing devices.

The customer devices 1302 may include one or more browser applications which may be used, for example, to provide a convenient interface to permit the customer to browse information available over the network 1312. For example, in one embodiment, the browser application may be implemented as a web browser configured to view information available over the Internet.

The customer devices 1302 may also include one or more toolbar applications which may be used, for example, to provide user-side processing for performing desired tasks in response to operations selected by the customer. In one embodiment, the toolbar application may display a user interface in connection with the browser application.

The customer devices 1302 may further include other applications as may be desired in particular embodiments to provide desired features to the customer devices 1302. In particular, the other applications may include a payment application for payments assisted by a payment service provider through the payment service provider device 1308. The other applications may also include security applications for implementing user-side security features, programmatic user applications for interfacing with appropriate application programming interfaces (APIs) over the network 1312, or other types of applications. Email and/or text applications may also be included, which allow customer payer to send and receive emails and/or text messages through the network 1312. The customer devices 1302 includes one or more user and/or device identifiers which may be implemented, for example, as operating system registry entries, cookies associated with the browser application, identifiers associated with hardware of the customer devices 1302, or other appropriate identifiers, such as a phone number. In one embodiment, the user identifier may be used by the payment service provider device 1308 to associate the user with a particular account as further described herein.

The merchant device 1304 may be maintained, for example, by a conventional or on-line merchant, conventional or digital goods seller, individual seller, and/or application developer offering various products and/or services in exchange for payment to be received conventionally or over the network 1312. In this regard, the merchant device 1304 may include a database identifying available products and/or services (e.g., collectively referred to as items) which may be made available for viewing and purchase by the customer.

The merchant device 1304 also includes a checkout application which may be configured to facilitate the purchase by the payer of items. The checkout application may be configured to accept payment information from the user through the customer devices 1302 and/or from the payment service provider through the payment service provider device 1308 over the network 1312.

Figure 14:
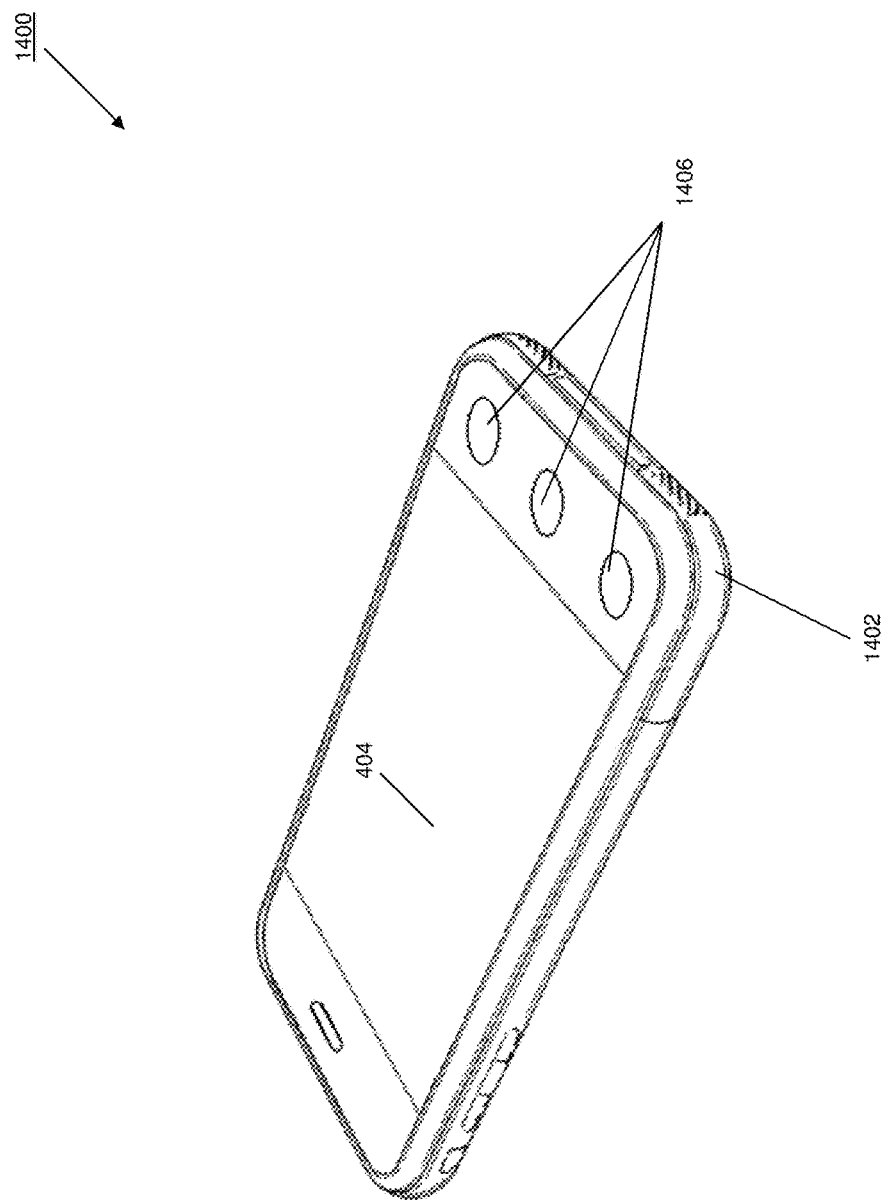
FIG. 14 is a perspective view illustrating an embodiment of a customer device.

Referring now to FIG. 14, an embodiment of a customer device 1400 is illustrated. The customer device 1400 may be the customer devices 800 or 1302 discussed above. The customer device 1400 includes a chassis 1402 having a display 1404 and an input device including the display 1404 and a plurality of input buttons 1406. One of skill in the art will recognize that the customer device 1400 is a portable or mobile phone including a touch screen input device and a plurality of input buttons that allow the functionality discussed above with reference to the methods above. However, a variety of other portable/mobile customer devices and/or desktop customer devices may be used in the methods discussed above without departing from the scope of the present disclosure.

Figure 15:
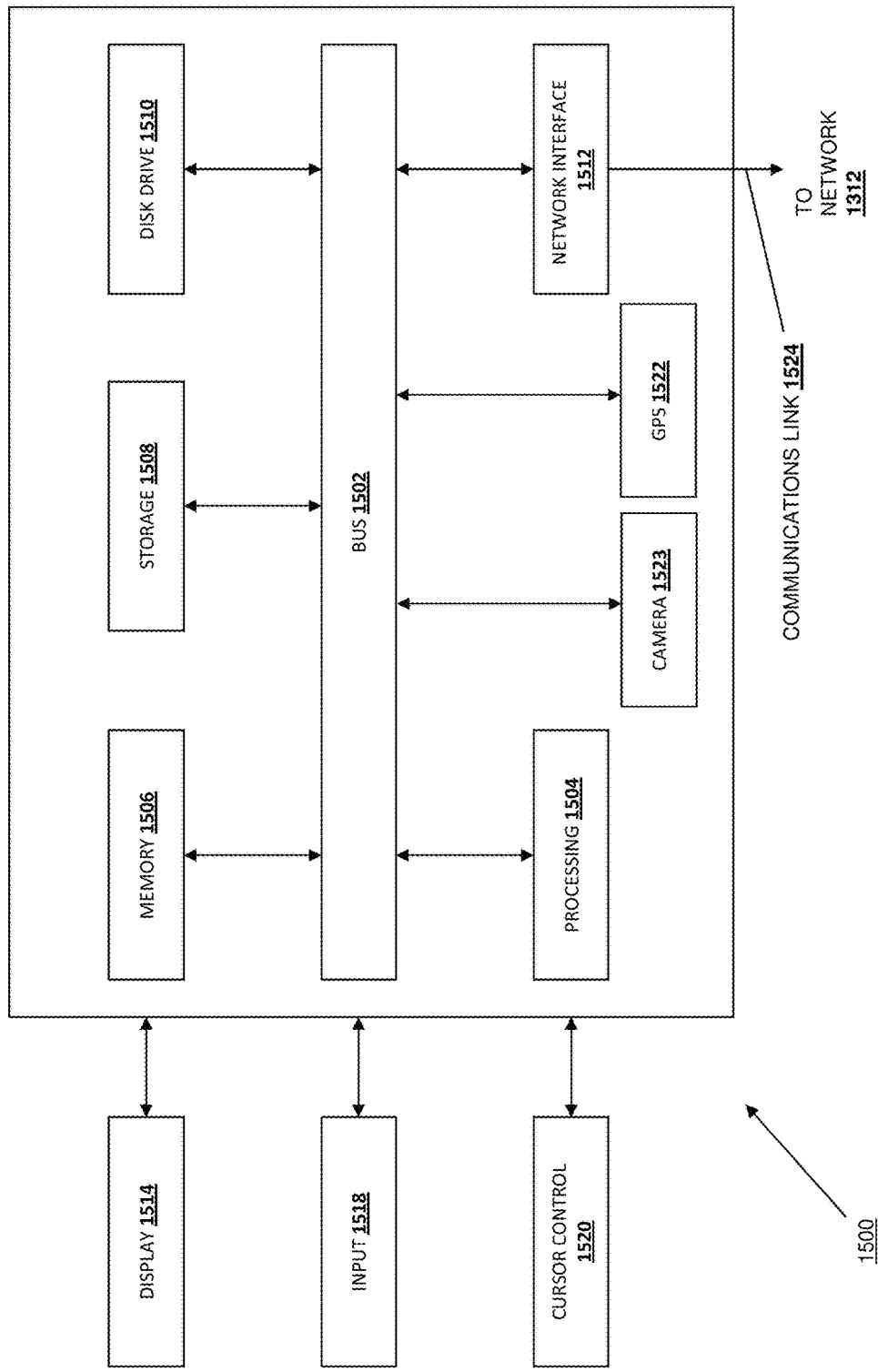
FIG. 15 is a schematic view illustrating an embodiment of a computer system.

Referring now to FIG. 15, an embodiment of a computer system 1500 suitable for implementing, for example, the customer devices 1302, merchant device 1304, beacon devices 1306, payment service provider device 1308, and/or system provider device 1310, is illustrated. It should be appreciated that other devices utilized by customers, merchants, beacon devices, merchant beacon communication devices, payment service providers, and/or system providers in the system discussed above may be implemented as the computer system 1500 in a manner as follows.

In accordance with various embodiments of the present disclosure, computer system 1500, such as a computer and/or a network server, includes a bus 1502 or other communication mechanism for communicating information, which interconnects subsystems and components, such as a processing component 1504 (e.g., processor, micro-controller, digital signal processor (DSP), etc.), a system memory component 1506 (e.g., RAM), a static storage component 1508 (e.g., ROM), a disk drive component 1510 (e.g., magnetic or optical), a network interface component 1512 (e.g., modem or Ethernet card), a display component 1514 (e.g., CRT or LCD), an input component 1518 (e.g., keyboard, keypad, or virtual keyboard), a cursor control component 1520 (e.g., mouse, pointer, or trackball), a location determination component 1522 (e.g., a Global Positioning System (GPS) device as illustrated, a cell tower triangulation device, and/or a variety of other location determination devices known in the art), and/or a camera component 1523. In one implementation, the disk drive component 1510 may comprise a database having one or more disk drive components.

In accordance with embodiments of the present disclosure, the computer system 1500 performs specific operations by the processor 1504 executing one or more sequences of instructions contained in the memory component 1506, such as described herein with respect to the customer devices 1302, merchant device 1304, beacon devices 1306, payment service provider device 1308, and/or system provider device 1310. Such instructions may be read into the system memory component 1506 from another computer readable medium, such as the static storage component 1508 or the disk drive component 1510. In other embodiments, hard-wired circuitry may be used in place of or in combination with software instructions to implement the present disclosure.

Logic may be encoded in a computer readable medium, which may refer to any medium that participates in providing instructions to the processor 1504 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1510, volatile media includes dynamic memory, such as the system memory component 1506, and transmission media includes coaxial cables, copper wire, and fiber optics, including wires that comprise the bus 1502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1500. In various other embodiments of the present disclosure, a plurality of the computer systems 1500 coupled by a communication link 1524 to the network 1312 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1500 may transmit and receive messages, data, information and instructions, including one or more programs (i.e., application code) through the communication link 1524 and the network interface component 1512. The network interface component 1512 may include an antenna, either separate or integrated, to enable transmission and reception via the communication link 1524. Received program code may be executed by processor 1504 as received and/or stored in disk drive component 1510 or some other non-volatile storage component for execution.

Figure 16:
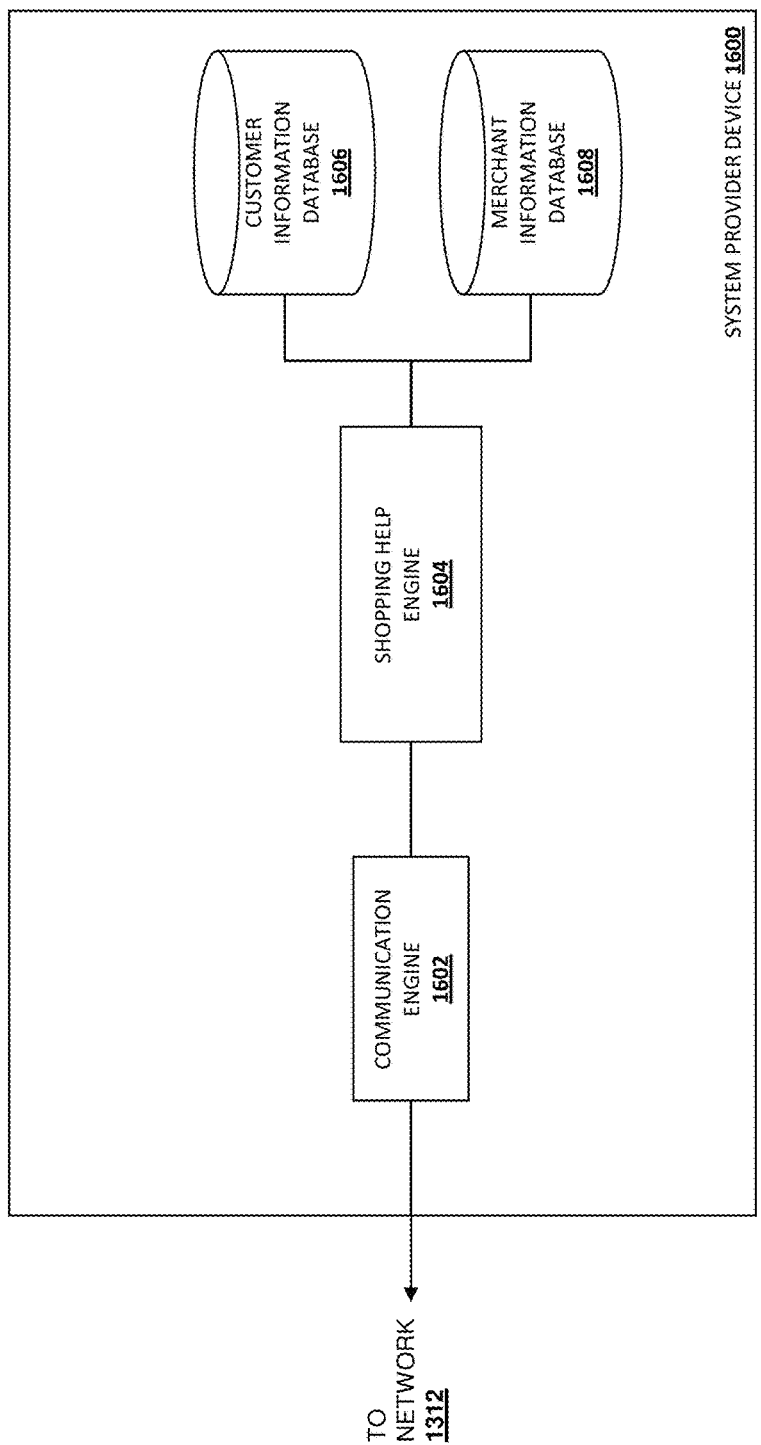
FIG. 16 is a schematic view illustrating an embodiment of a system provider device.

Referring now to FIG. 16, an embodiment of a system provider device 1600 is illustrated. In an embodiment, the device 1600 may be the system provider device discussed above. The device 1600 includes a communication engine 1602 that is coupled to the network 1312 and to a shopping help engine 1604 that is coupled to a customer information database 1606 and a merchant information database 1608. The communication engine 1602 may be software or instructions stored on a computer-readable medium that allows the device 1600 to send and receive information over the network 1312. The shopping help engine 1604 may be software or instructions stored on a computer-readable medium that is operable to collect information from the beacon devices, analyze that information, and provide the information, analysis, and recommendations to the customer and/or merchant as discussed above, as well as provide any of the other functionality that is discussed above. While the databases 1606 and 1608 have been illustrated as located in the device 1600, one of skill in the art will recognize that it may be connected to the shopping help engine 1604 through the network 1312 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A customer shopping help system, comprising:
a non-transitory memory storing product location information about a location of each of a plurality of products in a merchant physical location; and
one or more hardware processors coupled to the non-transitory memory and configured to execute instructions to cause the system to perform operations including:
determining that a first customer device and a second customer device that are located in the merchant physical location are linked;
retrieving, through a network, a shopping list from at least one of the first customer device or the second customer device, wherein the shopping list includes a plurality of shopping list product identifiers;
determining, using the product location information in the non-transitory memory, the location of each product of the plurality of products in the merchant physical location that corresponds to respective shopping list product identifiers of the plurality of shopping list product identifiers;
generating a merchant physical location screen that includes a map of the merchant physical location and providing the merchant physical location screen through the network that causes the merchant physical location screen to be displayed on each of the first customer device and second customer device;
tracking, through the network, a first path of the first customer device as the first customer device moves through the merchant physical location and a second path of the second customer device as the second customer device moves through the merchant physical location;
determining that at least one of the first customer device or the second customer device has reached a checkout area in the merchant location;
analyzing, in response to determining that at least one of the first customer device or the second customer device has reached the checkout area, the first path and the second path and the second path and determining based on the analyzing of the first path and the second path, a first area in the merchant physical location in which the first customer device and the second customer device have not been located; and
providing, through the network and causing to be displayed on the map of the merchant physical location screen provided on each of the first customer device and the second customer device, each of:

a first path identifier that includes a first path made up of a plurality of first customer device locations that were identified via the tracking of the first customer device through the merchant physical location;

a second path identifier that indicates a second path made up of a plurality of second customer device locations that were identified via the tracking of the second customer device through the merchant physical location; and a first area indicator that identifies the first area in the merchant physical location in which the first customer device and the second customer device have not been located and that includes at least one of the plurality of products in the merchant physical location that corresponds to respective shopping list product identifiers of the plurality of shopping list product identifiers.

2. The system of claim 1, wherein the determining that the first customer device and the second customer device that are located in the merchant physical location are linked includes:

detecting, through the network, the first customer device and the second customer device entering the merchant physical location;

identifying a proximity of the first customer device to the second customer device entering the merchant physical location; and determining, based on the proximity of the first customer device to the second customer device, that the first customer device and the second customer device are linked.

3. The system of claim 1, wherein the merchant physical location screen includes an indicator on the map of the merchant physical that indicates a relative location for at least some of the plurality of products in the merchant physical location that corresponds to respective shopping list product identifiers of the plurality of shopping list product identifiers.

4. The system of claim 1, wherein the operations further comprise:

providing, through the network for display on the first customer device and the second customer device, a product recommendation associated with the at least one of the plurality of products included in the first area.

5. The system of claim 1, wherein the first area in the merchant physical location includes at least one product in the merchant physical location that does not correspond to respective shopping list product identifiers of the plurality of shopping list product identifiers.

6. The system of claim 1, wherein the operations further comprise:

receiving, through the network, a message through the merchant physical location screen displayed on the first customer device; and providing, through the network, the message to the second customer device that causes the message to be displayed on the merchant physical location screen provided on the second customer device.

7. A method for providing customer shopping help, comprising:

detecting, by a system provider device, a first customer device and a second customer device in a merchant physical location;

retrieving, by the system provider device through a network, a shopping list from at least one of the first customer device or the second customer, wherein the shopping list includes a plurality of shopping list product identifiers;

determining, by the system provider device using product location information that identifies a location of each of a plurality of products in the merchant physical location, the location of each of the plurality of products in the merchant physical location that corresponds to respective shopping list product identifiers of the plurality of shopping list product identifiers;

generating, by the system provider device, a merchant physical location screen that includes a map of the merchant physical location, and providing the merchant physical location screen through the network that causes the merchant physical location screen to be displayed on each of the first customer device and the second customer device;

monitoring, by the system provider device through the network, the first customer device and the second customer device as the first customer device and the second customer device move through the merchant physical location;

determining that at least one of the first customer device or the second customer device has reached a checkout area in the merchant location;

analyzing, in response to determining that at least one of the first customer device or the second customer device has reached the checkout area, the first path and the second path and the second path and determining based on the analyzing of the first path and the second path, a first area in the merchant physical location in which the first customer device and the second customer device have not been located; and providing, by the system provider device through the network and causing to be displayed on the map of the merchant physical location screen provided on each of the first customer device and the second customer device, each of:

a first path made up of a plurality of first customer device locations that were identified via the monitoring of the first customer device moving through the merchant physical location;

a second path made up of a plurality of second customer device locations that were identified via the monitoring of the second customer device moving through the merchant physical location; and a first area indicator that identifies the first area in the merchant physical location in which the first customer device and the second customer device have not been located and that includes at least one of the plurality of products in the merchant physical location that corresponds to respective shopping list product identifiers of the plurality of shopping list product identifiers.

8. The method of claim 7, further comprising:

detecting, by the system provider device through the network, the first customer device and the second customer device as the first customer device and the second customer device enter the merchant physical location;

linking, by the system provider device based on a proximity of the first customer device to the second customer device upon entering the merchant physical location, the first customer device and the second customer device; and monitoring, by the system provider device based on the linking, the first customer device and the second customer device.

9. The method of claim 7, wherein the merchant physical location screen includes an indicator on the map of the merchant physical that indicates a relative location for at least some of the plurality of products in the merchant physical location that corresponds to respective shopping list product identifiers of the plurality of shopping list product identifiers.

10. The method of claim 7, further comprising:
providing, by the system provider device through the network for display on the first customer device and the second customer device, a product recommendation associated with the at least one of the plurality of products in the first area.

11. The method of claim 7, wherein the first area in the merchant physical location includes at least one product in the merchant physical location that does not correspond to respective shopping list product identifiers of the plurality of shopping list product identifiers.

12. The method of claim 7, further comprising:
receiving, by the system provider device through the network, a communication through the merchant physical location screen displayed on the first customer device; and
providing, by the system provider device through the network, the communication to the second customer device that causes the message to be displayed on the merchant physical location screen provided on the second customer device.

13. The method of claim 7, further comprising:
determining, by the system provider device, that the first customer device and the second customer device are linked and, in response, providing the merchant physical location screen to each of the first customer device and the second customer device and tracking each of the first customer device and the second customer device.

14. A non-transitory machine-readable medium having stored thereon machine-readable instructions executable to cause a machine to perform operations comprising:
establishing communications with a first customer device and a second customer device at a merchant physical location;
retrieving, through a network, a plurality of shopping list product identifiers from at least one of the first customer device or the second customer device;
determining a location of a respective product in the merchant physical location for each of the plurality of shopping list product identifiers;
providing, through the network to each of the first customer device and the second customer device, a merchant physical location screen that includes a map of the merchant physical location that causes the merchant physical location screen to be displayed on each of the first customer device and the second customer device;
communicating, through the network, with the first customer device and the second customer device as the first customer device and the second customer device move through the merchant physical location;
determining, through the network, a first path of the first customer device as the first customer device moves through the merchant physical location and a second path of the second customer device as the second customer device moves through he merchant physical location;

determining, through the network, that at least one of the first customer device or the second customer device has reached a checkout area in the merchant location;
analyzing, in response to determining that at least one of the first customer device or the second customer device has reached the checkout area, the first path and the second path and the second path and determining based on the analyzing of the first path and the second path, a first area in the merchant physical location in which the first customer device and the second customer device have not been located; and
indicating, through the network on the map of the merchant physical location screen provided on each of the first customer device and the second customer device, each of:
a plurality of first customer device locations included in the first path through the merchant physical location;
a plurality of second customer device locations included in the second path through the merchant physical location; and
a first area indicator that identifies the first area in the merchant physical location in which the first customer device and the second customer device have not been located and that includes at least one of the plurality of products in the merchant physical location that corresponds to respective shopping list product identifiers of the plurality of shopping list product identifiers.

15. The non-transitory machine-readable medium of claim 14, wherein the operations further comprise:
determining, through the network in response to establishing the communications with the first customer device and the second customer device, a proximity of the first customer device to the second customer device; and
communicating, through the network based on the proximity of the first customer device to the second customer device, with the first customer device and the second customer device as the first customer device and the second customer device move through the merchant physical location.

16. The non-transitory machine-readable medium of claim 14, wherein the merchant physical location screen includes an indicator on the map of the merchant physical that indicates a relative location for at least some of the respective products in the merchant physical location that corresponds to at least some of the plurality of shopping list product identifiers.

17. The non-transitory machine-readable medium of claim 14, wherein the operations further comprise:
providing, through the network to the first customer device and the second customer device, a product recommendation associated with at least one of the plurality of products included in the first area.

18. The non-transitory machine-readable medium of claim 17, wherein the first area in the merchant physical location includes at least one product in the merchant physical location that does not correspond to the plurality of shopping list product identifiers.

19. The non-transitory machine-readable medium of claim 14, wherein the operations further comprise:
receiving, through the network, a message through the merchant physical location screen provided for display on the first customer device; and
providing, through the network, the message to the merchant physical location screen provided on the second customer device.

20. The non-transitory machine-readable medium of claim 19, wherein the operations further comprise:
    determining that the first customer device and the second customer device are linked and, in response, providing the merchant physical location screen on each of the first customer device and the second customer device.

* * * * *